US007653580B2

(12) United States Patent
Charnley, Jr.

(10) Patent No.: US 7,653,580 B2
(45) Date of Patent: Jan. 26, 2010

(54) METHOD FOR EVALUATING DIFFERENCES IN THE PAST PERFORMANCE OF AN ASSET-CLASS POPULATION OF BOOK-VALUED INVESTMENTS

(75) Inventor: James Allen Charnley, Jr., Boston, MA (US)

(73) Assignee: Water Street Advisers, Inc., Boston, MA (US)

( * ) Notice: Subject to any disclaimer, the term of this patent is extended or adjusted under 35 U.S.C. 154(b) by 852 days.

(21) Appl. No.: 10/777,312

(22) Filed: Feb. 12, 2004

(65) Prior Publication Data
US 2004/0172353 A1    Sep. 2, 2004

Related U.S. Application Data

(60) Provisional application No. 60/446,567, filed on Feb. 12, 2003.

(51) Int. Cl.
*G06Q 40/00* (2006.01)
(52) U.S. Cl. .................................................. 705/36 R
(58) Field of Classification Search ................ 705/36 R
See application file for complete search history.

(56) References Cited

U.S. PATENT DOCUMENTS

2005/0075962 A1 * 4/2005 Dunne ........................ 705/36
2005/0114251 A1 * 5/2005 Sperandeo ................... 705/36

OTHER PUBLICATIONS

Markowitz, "Portfolio Selection", The Journal of Finance, vol. VII, No. 1, Mar. 1952, pp. 77-91.

Sharpe, "Capital Asset Prices: A Theory of Market Equilibrium Under Conditions of Risk", The Journal of Finance, Vo. XIX, No. 3, Sep. 1964.

Jensen, "Problems in the Selection of Security Portfolios-The Performance of Mutual Funds in the Period 1945-1964", The Journal of Finance, 1968.

Grant, "Market Timing and Portfolio Management" The Journal of Finance, vol. XXXIII, No. 4, Sep. 1978.

Malkiel, "Returns from Investing in Equity Mutual funds 1971 to 1991", The Journal of Finance, vol. 50, No. 2, Jun. 1995.

(Continued)

*Primary Examiner*—James A Kramer
*Assistant Examiner*—Eric T Wong
(74) *Attorney, Agent, or Firm*—Barlow, Josephs & Holmes, Ltd.

(57) ABSTRACT

The method of evaluating differences in the past performance of an asset class population of book valued investments. The analysis period that is of a length to include a significant portion of a market cycle is defined. A series of evaluation-period and selection-period performance statistics are calculated for the asset class population. Testing is conducted to find the correlation, performance and risk axes of the population as revealed during the analysis period. The dividing lines are calculated for subsequent evaluation-period populations of the asset class and use the groupings so identified to assign a value to each of the members of the asset class. This value will be the expected average performance strength of the investments within each group for a subsequent selection period. Findings of subsequent evaluation-period and selection periods can be included as they become available in the analysis period populations for re-execution of the method.

5 Claims, 18 Drawing Sheets

OTHER PUBLICATIONS

Sharpe, The Performance of the LS100 Funds, 1985-1994, Stanford University website, Los Altos, CA—http://www.stanford.edu/~wfsharpe/art/Is100/_5.htm.

Grinblatt, Mark and Titman, Sheridan, "The Persistence of Mutual Fund Performance", The Journal of Finance, vol. 67, No. 5, Dec. 1992.

Hendricks, Darryll; Patel, Jayendu; and Zeckhauser, Richard, "Hot Hands in Mutual Funds: Short-Run Persistence of Relative Performance, 1974-1988", The Journal of Finance, vol. 48, No. 1, Mar. 1993.

Goetzmann, William N. and Ibbotson, Roger G., "Do Winners Repeat?", The Journal of Portfolio Management, Winter 1994.

Brown, Stephen J. and Goetzmann, William N., "Performance Persistence", The Journal of Finance, vol. 50, No. 2, Jun. 1995.

Wermers, "Mutual Fund Performance: An Empirical Decomposition into Stock-Picking Talent, Style, Transactions Costs, and Expenses", The Journal of Finance, vol. 55, No. 4, Aug. 2000.

Carhart, "On Persistence in Mutual Fund Performance", The Journal of Finance, vol. 52, No. 1, Mar. 1997.

Tanous, "Investment Gurus", NY Institute of Finance, Englewood Cliffs, NJ, pp. 89-99.

* cited by examiner

| Grouping | Label | Correlation Coefficient |
|---|---|---|
| > avg stdev | green (G) | + 0.72 |
| < avg stdev | red ( R) | (-)0.72 |

|  | Correlation Coefficient | | |
| Constant[K] | Green (G) | Red (R) | Difference |
| --- | --- | --- | --- |
| stnd stdev=0 | 0.72 | (-)0.73 | 1.45 |
| 10.0 | 0.69 | (-)0.71 | 1.40 |
| 4.0 | 0.65 | (-)0.66 | 1.31 |
| 3.0 | 0.61 | (-)0.64 | 1.25 |
| 2.0 | 0.40 | (-)0.56 | 0.96 |
| 1.5 | 0.20 | (-)0.45 | 0.65 |
| 1.0 | 0.13 | (-)0.23 | 0.36 |
| 0.5 | 0.55 | (-)0.67 | 1.22 |
| 0.0 | 0.72 | (-)0.74 | 1.46 |
| (-)0.5 | 0.73 | (-)0.75 | 1.48 |
| (-)1.0 | 0.76 | (-)0.76 | 1.52 |
| (-)4.0 | 0.74 | (-) 0.74 | 1.48 |

| Constant[K] | Efficiency Ratio | | Ratio Range | Statistical Significance |
|---|---|---|---|---|
| | Green (G) | Red (R) | | |
| stnd stdev=0 | 1.00 | .99 | 1.99 | 97.8 |
| 10.0 | 1.05 | 1.06 | 2.11 | 98.3 |
| 4.0 | 1.26 | 1.24 | 2.50 | 99.1 |
| 3.0 | 1.39 | 1.32 | 2.71 | 99.3 |
| 2.0 | 1.59 | 1.48 | 3.07 | 99.6 |
| 1.5 | 1.55 | 1.50 | 3.05 | 99.6 |
| 1.0 | 1.24 | 1.55 | 2.79 | 99.3 |
| 0.5 | .15 | .46 | 0.61 | 76.0 |
| 0.0 | .46 | .51 | 0.97 | 87.0 |
| (-)0.5 | .73 | .72 | 1.45 | 94.3 |
| (-)1.0 | .84 | .81 | 1.65 | 97.8 |
| (-)4.0 | .96 | .95 | 1.91 | 97.5 |

| Grouping | Correlation Coefficient | Efficiency Ratio | Confidence Level |
|---|---|---|---|
| Green (G) | 0.64 | 1.31 | 99% |
| Red (R) | (0.75) | (1.02) | 98% |
| Yellow1 (Y1) | 0.72 | (0.10) | 69% |
| Yellow2 (Y2) | (0.52) | 0.03 | 63% |

| Grouping | Correlation Coefficient | Efficiency Ratio | Confidence Level |
|---|---|---|---|
| Green (G) | 0.53 | 0.05 | 67% |
| Red (R) | (0.80) | (0.90) | 97% |
| Yellow1 (Y1) | 0.72 | 0.61 | 92% |
| Yellow2 (Y2) | (0.58) | (0.01) | 60% |

| Grouping | Correlation Coefficient | Efficiency Ratio | Confidence Level |
|---|---|---|---|
| Green | 0.72 | 1.00 | 98% |
| Red | (0.73) | (0.99) | 98% |

| Grouping | Correlation Coefficient | Efficiency Ratio | Confidence Level |
|---|---|---|---|
| Green (G) | 0.73 | 0.96 | 98% |
| Red (R) | (0.76) | (0.86) | 96% |
| Yellow1 (Y1) | 0.15 | (0.75) | 92% |
| Yellow2 (Y2) | (0.03) | 0.37 | 81% |

| Grouping | Correlation Coefficient | Efficiency Ratio | Confidence Level |
|---|---|---|---|
| Green (G) | 0.61 | 1.36 | 99% |
| Red (R) | (0.70) | (1.20) | 99% |
| Yellow1 (Y1) | 0.73 | 0.42 | 85% |
| Yellow2 (Y2) | (0.62) | (0.25) | 74% |

| Grouping | Correlation Coefficient | Efficiency Ratio | Confidence Level |
|---|---|---|---|
| Green (G) | 0.73 | 1.14 | 99% |
| Red (R) | (0.81) | (1.15) | 99% |
| Yellow1 (Y1) | 0.82 | 0.36 | 81% |
| Yellow2 (Y2) | (0.55) | 0.44 | 86% |

METHOD FOR EVALUATING DIFFERENCES IN THE PAST PERFORMANCE OF AN ASSET-CLASS POPULATION OF BOOK-VALUED INVESTMENTS

CROSS REFERENCE TO RELATED APPLICATIONS

This application claims the benefit of U.S. Provisional Application Ser. No. 60/446,567, filed Feb. 12, 2003.

BACKGROUND OF THE INVENTION

Investors have long sought in vain a method for determining the future relative value of an investment from an analysis of its relative value in a past period. This is an invention to provide such an evaluative tool for book-valued investments.

It is convention in the investment industry to value investments by their investment performance over time, and to make judgments as to the relative value of investments in terms of differences in investment performance between investments whose performance have historically reacted similarly to changes in market conditions. Populations of these similar investments are grouped as 'asset classes', and it has become common practice to base the construction of these asset classes on the tenets of Modern Portfolio Theory (MPT), whereby populations of investments are grouped by virtue of the characteristic of having uniquely similar patterns and levels of investment risk in a past time period.

It has also become common practice to summarize the average performance characteristics of such asset classes in terms of a 'market' or 'securities' line—a division into halves of the distribution of investment performance found among an asset class population, constructed under the tenets of the Capital Assets Pricing Model (CAPM). The return for an individual investment within the asset class is compared to the return as modeled by this market line and the difference represents the value of the investment's performance relative to the asset-class average. This incremental value is defined within the industry as either an investment's 'differential return' or its 'alpha'.

Economists have long sought to use the differences in value found by an investment's relationship to its market line in a prior period ('evaluation period') to signal a reliable difference in value in a future period ('selection period'). They have been frustrated by the weak and conflicting results achieved by this evaluative methodology.

It is the common practice within the investment management industry to define investment performance in terms of risk and reward. Dr. Harry Markowitz provided the generally accepted definition of this term, in his thesis, "Modern Portfolio Theory" (MPT), proposing that the value of an investment to its investors was found in the tradeoff between the return generated by the investment over time and the risk of that investment. Markowitz, 1952.

In MPT, Markowitz proposed a method to measure this tradeoff, creating definitions for its component parts that could be quantified mathematically. He defined investment return as the average of the periodic returns of an investment over time ('mean'), and investment risk as the volatility of those periodic returns over that time period ('variance'). It has become convention to calculate investment performance in terms of this 'mean-variance' relationship and document performance in terms of a 'mean-variance graph' as illustrated in prior art FIG. 1.

Markowitz also recommended a strategy for maximizing the available performance of an investment portfolio. His MPT provided that mathematical proof that the efficiency of such a portfolio could be maximized if it were made up of investment assets that provided different and offsetting patterns of periodic-return volatility over time. He offered a procedure for quantifying this point—an algorithm to calculate portfolio-level investment risk from the pair-wise covariant relationship between the investment risk of its component investments.

Such an algorithm produces a 'costly' calculation—the number of pair-wise relationships that need to be calculated increases exponentially as a function of the number of investment alternatives considered. This shortcoming has led to the practice that such 'asset-allocation strategies' be computed from 'a small handful of investment alternatives'. It has become prevailing industry practice to cast asset-allocation strategies in terms of this small number of investment market alternatives, constructing a finite number of 'asset-classes' from populations of individual investments that have historically demonstrated a uniquely common pattern of investment risk and using the average investment performance of these asset-class populations or of an asset class-index as the proxy for the effect of combining individual investments within an allocation strategy.

The industry of investment management entails the management of investment portfolios. Based on the structures promulgated by the tenets of MPT, the investment manager's job is comprised of (2) functions. First, an asset-allocation strategy must be selected in terms of the combination of a small number of broad asset classes whose performance is representative of a large population of alternative investments. Next, one or more individual investments must be selected from within each selected asset class with which to implement this strategy.

The value of the allocation strategy selected is based on the extent to which the future risk of the strategy remains a match for the risk tolerance of the portfolio holder and the future performance of that strategy betters that of alternative strategies at a like level of risk. The value of the investments selected is dependent on the extent by which their future investment performance surpasses the average of their asset-class peers.

The present invention, as will be described in detail below, is an evaluative process that pertains to the second of these (2) management functions—the selection of investments within an asset-class. Its use is limited to those asset-classes that are made up of book-valued investments. The primary market for book-valued investments is the one for book-valued collective investment funds—privately-managed investment portfolios, collective and common trusts, unit-investment trusts, separate accounts, open-ended investment companies (mutual funds), and other such collections of investment securities whose valuation is solely related to the net-asset value of the securities within the collection. By far, the largest and most visible market for these book-valued collective investment funds is the mutual fund market, and the utility of this invention is illustrated in terms of the performance characteristics of that market since 1991.

It has become convention to value the investments within an asset-class by virtue of differences in investment performance in a prior time period—most usually a prior period that ends at the date at which the evaluation takes place. Industry marketing literature is replete with claims from investment providers that tout their prior-period 'track-record' vis-à-vis their asset-class peers or against an index that is thought to be emblematic of the average performance of those peers.

Economists have sought to validate this valuation process by finding evidence of the persistency of these performance differences into a future period—to find that the 'winners' of an asset class so identified in the past, remain winners into the future. They have been frustrated in their efforts in that the empirical evidence of such persistency collected using existing analytical processes has been weak and conflicting. Notwithstanding the lack of evidence confirming that differences in past performance provides a useful signal of differences in future performance, the practice of evaluating the worthiness of investments based on the past strength of their performance relative to their asset-class peers prevails among industry practitioners and investors.

Therefore, there is a need for a corrective process that improves on the existing procedures in general use for valuing the past performance of book-valued investments within an asset-class. The present invention solves for the conundrum posed by past analyses of empirical data regarding the persistency of performance differences, producing, as a narrow application, an evaluative technique of practical relevance for those practitioners that believe they possess special knowledge of future market trends. This basic process is further enhanced to provide a wider application—a method of evaluating differences in past performance that has practical relevance for those practitioners that profess no special knowledge or ability to predict future market trends, and that require a valuation procedure that retains its legitimacy regardless of the future path of market conditions.

This invention is based on and relates to (2) insights regarding the operation of book-valued asset-class populations of investments that are novel and unique. The claim of uniqueness made for this invention lies in the novelty of these insights, and their proof is contained in a review of the academic and industry-related literature since the introduction of MPT. Its utility is demonstrated through the analysis of the differences in future performance between segments of conventional asset-class populations of mutual funds that can be identified through these processes for quarterly evaluation periods December 1991 and June 2002.

Differences in investment performance between mutual funds within an asset-class have historically been documented through an analysis based on the tenets of the Capital Assets Pricing Model (CAPM). [Sharpe, 1960] This is the existing evaluative framework. This model is central to processes in use in the investment industry in that it provides the theoretical underpinning for using an asset-class average or class-index as the proxy for a population of investment alternatives within the analytical processes of MPT.

Sharpe's CAPM defines the average performance for a population of asset-class funds as a linear relationship derived from a point of zero investment risk, through a point of average investment risk and return for the population and extending across the range of risk available within the asset-class population. This 'market line' or 'securities line' summarizes the average investment performance found within a population of investments whose individual performance is assumed to form a normal or otherwise stable, symmetric distribution around this line.

Within this model, a fund whose past performance has been found to reside above the market line on a mean-variance graph is generally evaluated as 'strong'; a fund whose performance resides below the market line is graded as 'weak'. Prior art FIGS. 2 and 3 illustrate the CAPM view of an asset-class population in terms of the mean-variance paradigm. According to FIG. 2 and under the tenets of the CAPM, the average investment performance for an asset class population of investments is represented by a 'market line'. On the mean-variance graph of FIG. 2, this market line is a straight line drawn from a point of zero risk (y-axis), through the point of average risk and return for the asset class and across the breadth of risk present in the asset class population.

For purposes of illustration, the charts used in the industry typically follow the convention of color-coding populations of funds whose average investment performance is thought to be 'strong' relative to their class peers as 'green (G)' (referred to as "G" herein); those whose average performance is considered 'weak' relative to their peers as 'red' (referred to as "R" herein); and populations whose average performance is not significantly different from the class average of their peers as 'yellow' (referred to as Y herein) including yellow 1 (Y1) and yellow 2 (Y2). FIG. 3 introduces this coding convention.

The vertical distance from a market line in FIG. 3 is the measurement of an investment's 'differential return' for an asset-class population whose investment risk is measured in terms of the standard deviation of their periodic returns. This vertical distance is termed an investment's 'alpha' for those asset-class populations whose investment risk is measured in terms of the covariance of their periodic returns ('beta').

Within the analytical structure of the CAPM, an investment's performance in a prior time period is considered 'strong' if its point when plotted on a mean variance graph resides above the market line (G). Its performance is 'weak' if its point resides below the line (R) FIG. 3.

However, there are issues with the known existing evaluative framework. For it to be of practical use, the evaluation of a fund's performance relative to its asset-class peers in a past-period must have some bearing on the fund's expected investment performance relative to those peers into the future.

Since the inception of CAPM, economists have sought to find a process for sectioning the distribution of past-period investment performance for an asset-class population of funds in a manner that would reveal differences in their future performance. This effort has historically centered around 'a search for the holy-grail' which is a method of predictive selection that would consistently signal which fund managers would be 'the winners' of a future period. Their methods have been based on the concept that the successful track record of fund managers in a past period should persist—that 'winners repeat'. Thus said, the segmentation strategies employed have revolved around dividing an asset-class population between its strongest and weakest members in terms past-period investment performance and looking for a pattern of persistent differences in investment performance from these segments into the future.

Economists have been singularly unsuccessful in this pursuit. Selecting for those funds whose past performance has been most positive (the top 100 performers, for example) has generated a mixed picture. There exist a host of studies where analysts have found that rather than signaling future strength, membership in the strongest-performing group in a past period ensures only a marginal chance of a positive future at best, and in most cases, results in negative future performance differences. [Jensen, 1968], [Grant, 1978], [Malkiel, 1995], [Sharpe, 1996]

Other studies, taken over different analysis periods offer somewhat conflicting conclusions—finding positive differences in investment performance within an asset-class of funds that can persist, albeit for only short time-periods into the future and under special market conditions. [Grinblatt, 1992], [Hendricks, 1993], [Goetzmann, 1994], [Brown, 1995], [Wermers, 1996], [Cahart, 1997]

The common thread in these analyses—the one conclusion of practical use—has been the finding that the section of a population that contains the worst-performing funds for a past period persists in being among the worst-performers of a future period.

"The added return in the past, because of a relatively small degree of persistence, is a pretty rotten indicator unless it is big and negative." [Tanous, p.99, 1997]

Frustrated at finding a valuable indicator among differences in past-period investment performance, with the exception of identifying the losers, economists have taken to using their evaluative results to denigrate the efforts of their peers that just happen to be managers of mutual funds.

"The year-to-year ranking of most mutual funds appear largely random . . . the only significant persistence not explained is concentrated in strong under-performance by the worst-return mutual funds . . . the[se] results do not support the existence of skilled or informed mutual fund managers." [Cahart, 1997]

This regression in the utility of evaluative processes based on past-period differences in asset-class performance to a tool for the parochial infighting among practicing economists does not create any value for the investor attempting to evaluate the efficiency of the management of their portfolio holdings. What is needed is a renovation of the process to be of practical service to that investor.

It is reasonable for an investor to have an interest in identifying how their investments within an asset class, whether structured as a private portfolio or one or more other types of book-valued collective funds, have performed relative to their peers. It is also reasonable for that investor to have an expectation that the prevailing convention of utilizing differences in past performance to value funds holds some significance for signaling differences in future performance. The objective of this invention is provide for these reasonable needs—to provide a renovated process of identifying differences in past-period performance among book-valued collective investment funds that does have a relevance to future differences to be found in an asset-class population of these funds.

SUMMARY OF THE INVENTION

The present invention addresses and corrects for the errors inherent in this existing methodology as it is applied to asset-class populations of book-valued investments. Its procedures are based, in part, on a novel and unique insight regarding the characteristics of groups created by the bisection of the performance distribution of an asset class population of investments. This insight is that the bisection of a performance distribution identified during an evaluation period creates (2) groups of investments whose future average investment performance will be counter-cyclical to one another over a subsequent selection period.

In regard to a process for grouping investments for evaluative purposes, this insight leads to a required procedure that the first step of any such process be the separation of the counter-cyclical halves. The market line for an asset class population is not necessarily the most efficient division strategy for this procedure. This invention outlines a process for finding the bisection strategy—the 'correlation axis'—that is characteristically most efficient in this regard.

The evaluative distinctions created by dividing an asset class population by its correlation axis are augmented by a further procedure to find the bisection of the performance distribution during an evaluation period which will result in (2) population halves whose relative strength of average investment performance in a subsequent selection period will be the most dissimilar—the 'performance axis' for an asset class population.

This dividing line is used in conjunction with the correlation axis to segment an asset class population into quadrants whose of future performance characteristics fall within (3) categories—that quadrant of investments whose future average performance will be consistently stronger than average ('green (G)'); that quadrant whose future average performance will be consistently weaker than average ('red (R)'); and a remaining (2) quadrants containing investments whose future average performance will not significantly deviate from the class average, but whose deviations will be counter-cyclical and offsetting over time ('yellow (Y1 and Y2)').

These division processes are further augmented by another that arises from a second unique insight into the mechanics of a book-valued asset class investment population. This insight is that the slope of the distribution of investment performances around an asset class average, when defined as the function of investment return and risk, does not conform to the slope of a market line through its average, as modeled by the CAPM (greater risk=greater return), but to a horizontal line passing through that average (greater risk=same return).

The phenomenon is unique to asset classes of book-valued investments and its result is that as the timeframe used for an evaluation period becomes longer, a disproportionate share of the strongest-performing investments can be found at the left-hand or least-risky side of an asset class performance distribution, and the weakest or most-risky at the right hand side of that distribution as represented on a mean-variance graph. This 'risk-axis' is used with either of the correlation or performance axes as an alternative procedure to create evaluation quadrants whose distinctions in terms of future performance are significant. Used in conjunction with both the correlation and performance axes, this division line produces an evaluative procedure whose distinctions in terms of future performance are more significant than a process using only two axes.

These processes are unique and novel because they arise from insights regarding the mechanics of book-valued asset classes that are novel and unanticipated in either the prior art or industry literature. The utility of these processes is proven against the operations of the asset class most often utilized for these industry studies over the most recent time period that encompasses a full market cycle for the market underlying this asset class.

The procedures of proof used in this invention are in themselves unique by virtue of their reliance on assessing results based on a full market cycle and their use of the devices that are based on the insights unique to the invention. These processes of proof need to be implemented to validate the characteristic evaluative properties of other asset classes and to identify the correlation, performance and risk axes specific to those asset classes. They are integral to extending the utility of the invention to other asset classes.

The processes of the present invention are also integral to the continued validity of the evaluative process. The evaluative process represents a procedure to systematically solve for a business issue—it is a business process. The continued validity of a business process is more tenuous than that of a mechanical process because the 'laws' that underlie business behavior are fluid whereby those underlying mechanical phenomena are static. The utility of any business process is contingent of the expectation that the environment for that process will remain constant, or that the utility of that process will be resilient to the changes that occur over time in that environment. Business processes, to be of practical use, must contain a procedure for reaffirming their utility and relevance over time.

In addition to their use in identifying the appropriate evaluation criteria for other asset-classes beyond those tested for this patent application, the procedures of proof undertaken also have a continuing use to re-validate the continued relevance of evaluation criteria established for the asset classes researched for this patent, as well as for new asset classes, into time periods beyond the used to prove the utility of the process under application.

This invention also includes a second type of process to establish evaluative groupings of book-valued investments. This second process type is a constructive process, building groupings from assemblages of small asset class sections, as opposed to the deconstructive processes outlined above that start from a bisection of the class. The uniqueness of this process arises from a common procedure to validate its utility as an evaluative system. The key result from these common procedures of proof is the process requirement that groupings built by construction must be from assembled from contiguous small sections, for the process to be valid as an evaluation system.

The overall procedure for implementing these processes to come to an operative evaluation system, in accordance with the present invention, are as follows:
  a. construct an asset class of investments using the tenets of MPT or other processes that classify investments of similar type;
  b. define an analysis period that is of a length to include a significant portion of a market cycle;
  c. calculate a series 'analysis periods' made from the pairings of evaluation-period and selection-period performance statistics for the asset class population;
  d. test to find the correlation, performance and risk axes of the population as revealed during the analysis periods;
  e. calculate these dividing lines for subsequent evaluation-period populations of the asset class and use the groupings so identified to assign a value to each of the members of the asset class—this value will be the expected average performance strength of the investments within each group for a subsequent selection period;
  f. include the findings of subsequent evaluation-period and selection periods as they become available in the analysis period populations and redo test.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
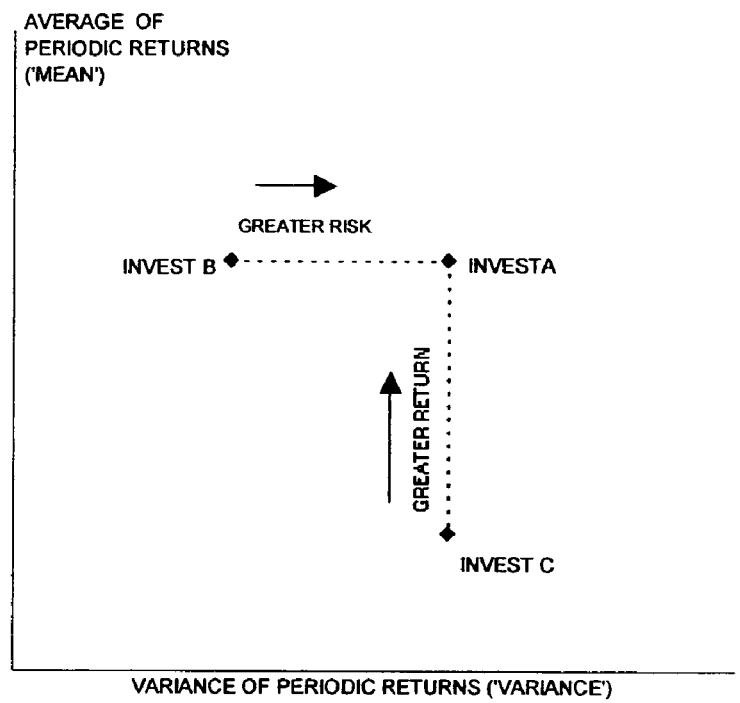
FIG. 1 is a prior art mean-variance graph showing the relationship of risk of return that represents the measurement of investment performance.
Figure 2:
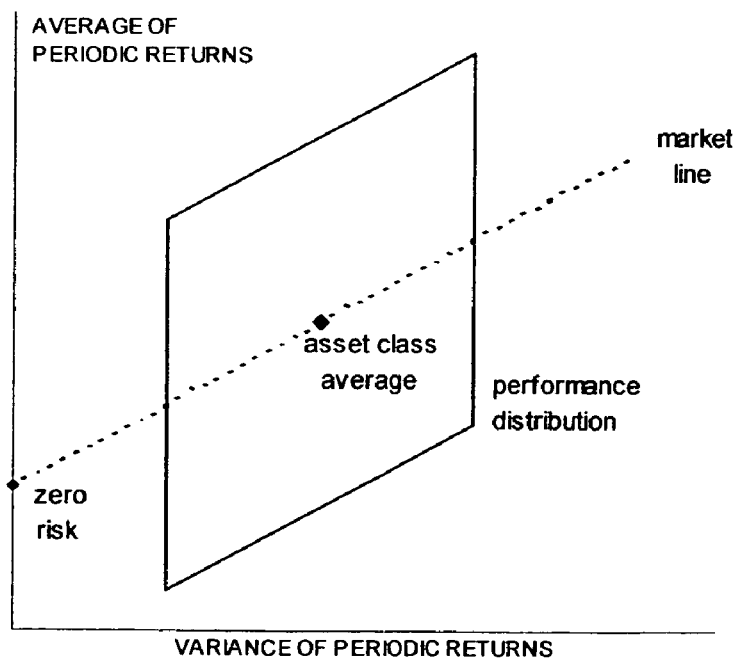
FIG. 2 is a prior art mean-variance graph with market line drawn through the point of zero risk, point of average risk and return for the asset class that represents the average investment performance for a group of alternative investments.
Figure 3:
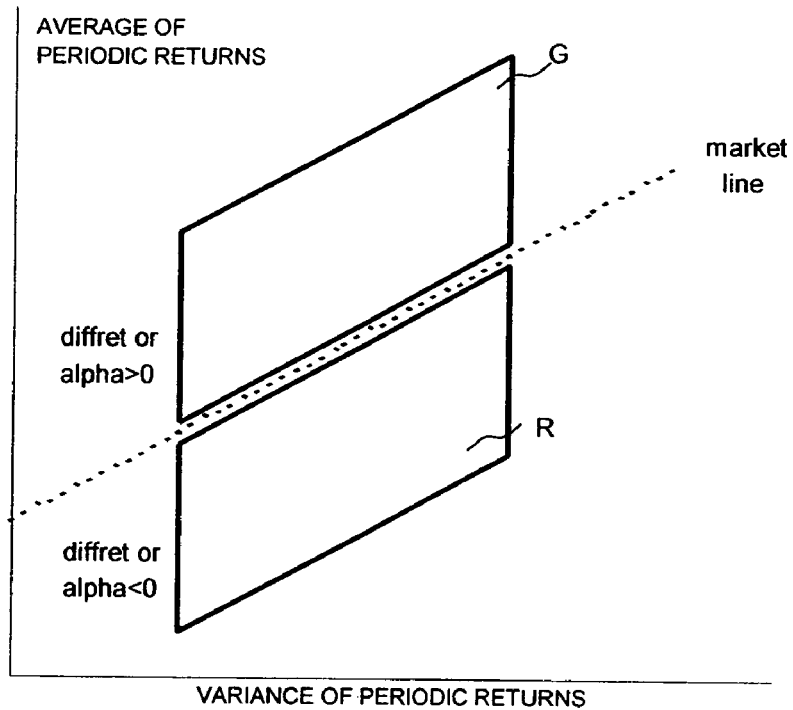
FIG. 3 is a prior art mean-variance graph with market line dividing investment performance for a group of alternative investments into strong and weak sections.

The present invention, providing a new perspective to be taken with a constructive attempt to provide a useful evaluative system based on differences in past performance in the face of a consistent history of past failures to do so—arises from an unique insight regarding the behavior of book-valued asset-class populations. This insight is that the difference between class members that perform better than their class average and those that perform worst in a past period is not a difference between those whose performance will either be good or bad in a future period, but between funds whose future performance will either run parallel to or contrary to the future strength of the financial market that underlies that asset class during that future period.

This is an insight that can be demonstrated using the performance characteristics since 1991 for the population of mutual funds most often used for past studies—those funds investing exclusively in domestic equities (U.S. stock funds). During that timeframe, the market for domestic equities progressed through a rise and fall of extraordinary dimension. The amplitude of this market cycle was large enough to reveal to cross-cyclical nature of its fund asset-class when segmented along its market-line average.

A population of mutual funds investing exclusively in the domestic equities markets, and with at least five years operations, was identified each quarter ending December 1991 to June 1999. The investment performance for each of these funds for the five years immediately preceding their identification was calculated ('evaluation period'), a market line constructed from the average of their performances and the strength of each fund's investment return relative to that market line measured ('differential return').

These funds were segmented into (2) groups—those whose differential return was greater than (G) and those whose differential return was less than (R) the market-line average in the evaluation period. The fortunes of the funds in each of these quarterly 'population groupings' were followed for a subsequent 3-year period. A market line was constructed from the average asset-class performance for this 3-year 'selection period'. The strength of each fund's investment return relative to this market line measured, and this differential return calculation was standardized around each 3-year class average.

In keeping with academic convention regarding the analysis of comparative investment performance, each fund's differential return was calculated using the average returns for the 3-year selection period and the periodic-returns variance of its preceding 5-year evaluation period. In practical terms, this analysis procedure equates to comparing the expected strength of future investment returns under the conditions of historical investment risk. [Fama, 1973].

Although ensuring its legitimacy in light of past methods, this procedure limits the applicability of the invention to an evaluative process—a process that ties past experiences regarding risk to future expectations regarding returns. It does not ensure the invention's applicability to selection processes—methods to predict a fund or group of funds whose future returns relative to the future risk of those returns will result in significant differences in future performance relative to an asset-class population of its peers. For a process that addresses this need, reference is made to the pending patent application, "Method for Selecting Investments in Book-Valued Collective Investment Funds", Ser. No. 60/342,825, filed Dec. 28, 2001.

Figure 4:
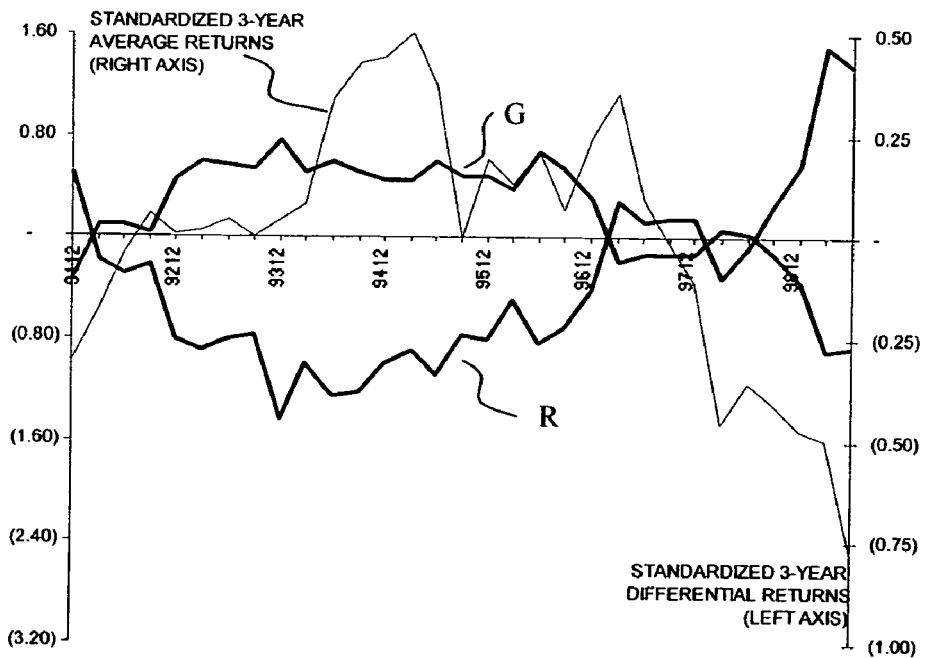
FIG. 4 is a graph demonstrating that for the subject population of alternative investments used for the analysis of the processes of this invention, the relative average investment performance of alternative investments selected as members of either the strong or weak sections in a series of prior evaluation periods will be cross-cyclical to the average investment performance of that population of investments in a series of subsequent selection periods.

To document the variability of market conditions, an average of 3-year returns was calculated for the asset-class each quarter and standardized around its analysis-period mean. The history of these standardized 3-year return calculations for each evaluation period was plotted on a timeline for the 3-year periods ending December 1994 to June 2002. Next, the averages for the 3-year differential returns in each subsequent selection period for the (G) and (R) groupings identified each prior evaluation period were also plotted on this timeline to determine the cross-cyclical characteristics of these groupings. FIG. 4 illustrates the results of this analysis of the method of the present invention where the relative selection-period performance of funds rated as strong in a prior evaluation period was highly correlated to the strength of the market during the following selection period; the relative selection-period strength of funds rated weak in a prior period ran counter to selection-period market conditions.

Figure 5:
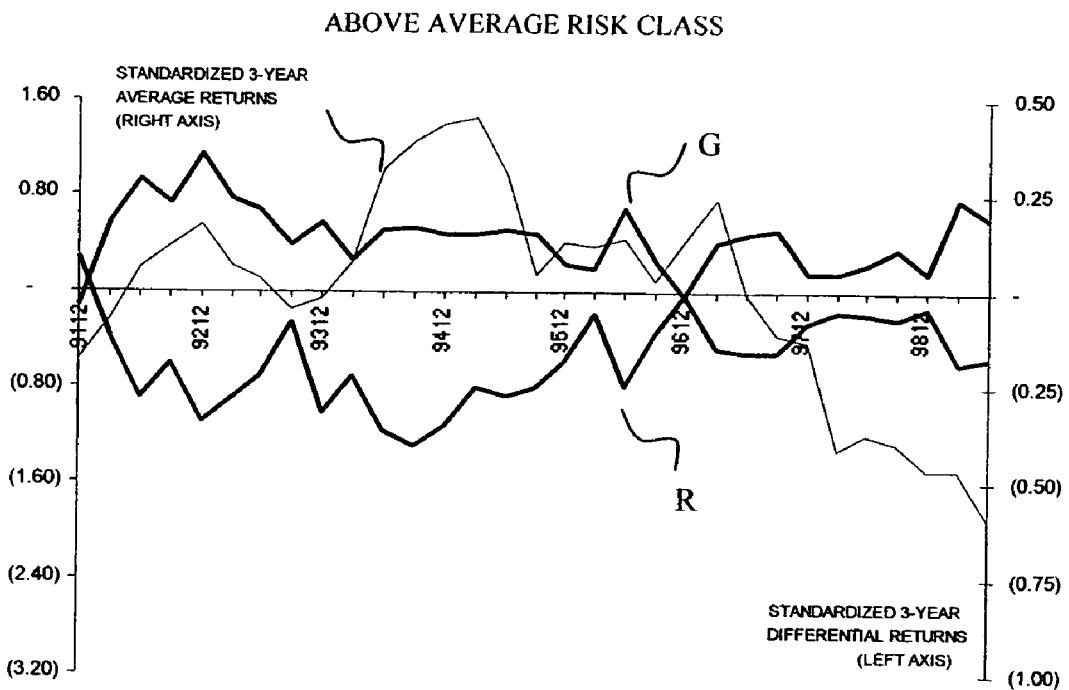
FIG. 5 is a graph demonstrating that for an alternative population of alternative investments made from funds investing in mid and large cap U.S. equities, the relative average investment performance of alternative investments selected as members of either the strong or weak sections in a series of prior evaluation periods will be cross-cyclical to the average investment performance of that population of investments in a series of subsequent selection periods.
Figure 6:
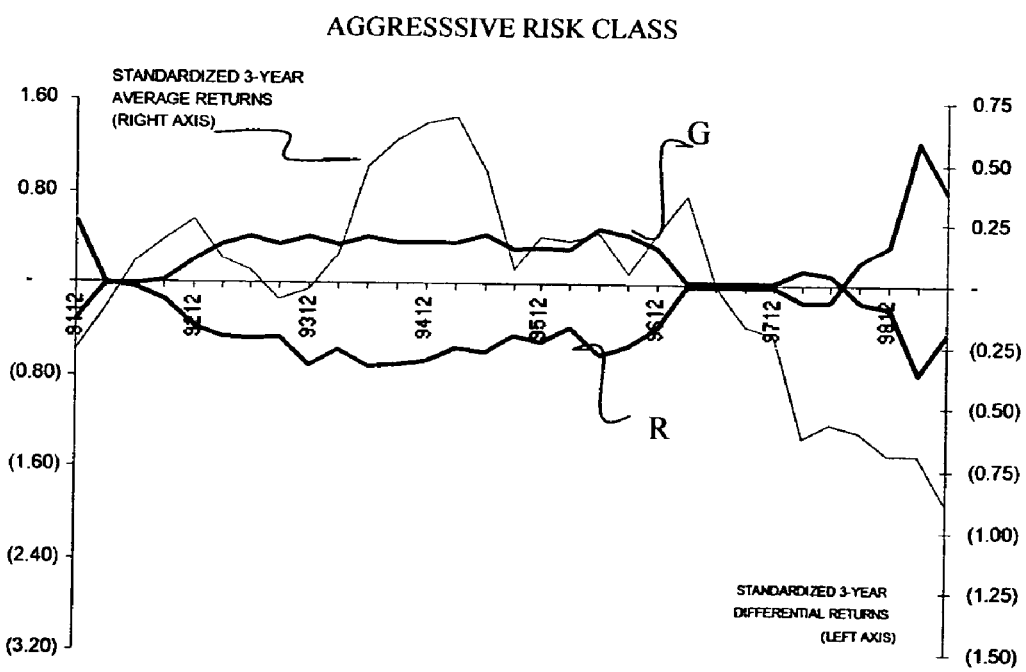
FIG. 6 is a graph demonstrating that for an alternative population of alternative investments made from funds investing in small-cap and high-growth U.S. euqities, the relative average investment performance of alternative investments selected as members of either the strong or weak sections in a series of prior evaluation periods will be cross-cyclical to the average investment performance of that population of investments in a series of subsequent selection periods.

This cross-cyclical characteristic can be demonstrated for a range of asset-class populations of funds. The asset-class of funds investing in domestic equities is divided into (2) asset-classes based on differences in their average levels of periodic-return volatility—an Above Average and Aggressive asset class. The history of these asset classes and their blue and orange population groupings is shown in FIG. 5 and FIG. 6. In FIG. 5, the cross-cyclical nature of asset class performance distributions bisected by a market line can be documented for other asset classes of book-valued investments related to the U.S. stock markets.

Figure 7:
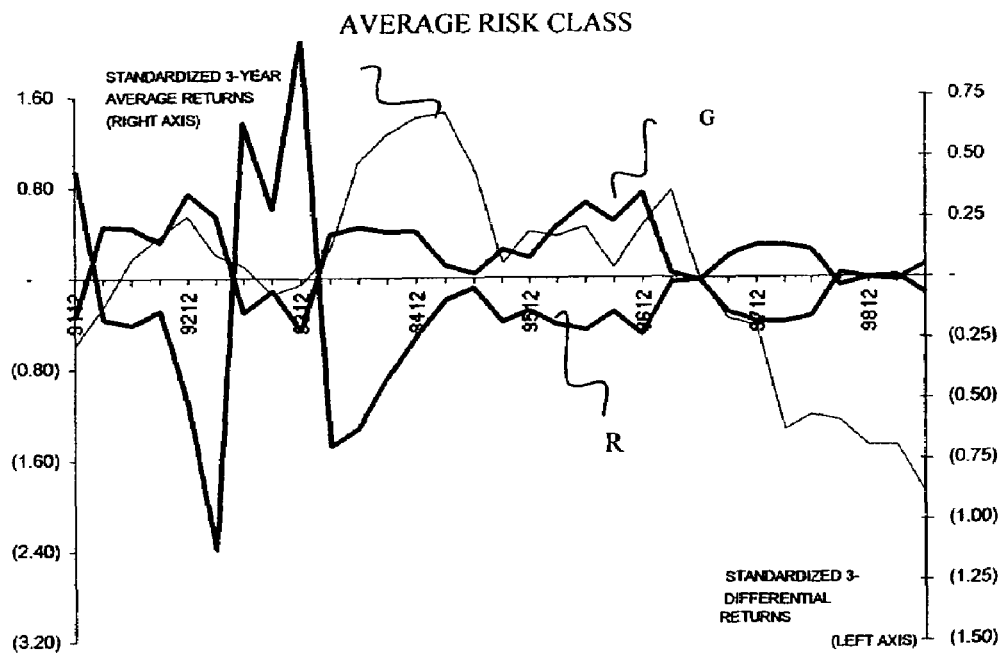
FIG. 7 is a graph demonstrating that for an alternative population of alternative investments made from funds investing in U.S. and foreign bonds, the relative average investment performance of alternative investments selected as members of either the strong or weak sections in a series of prior evaluation periods will be cross-cyclical to the average investment performance of that population of investments in a series of subsequent selection periods.
Figure 8:
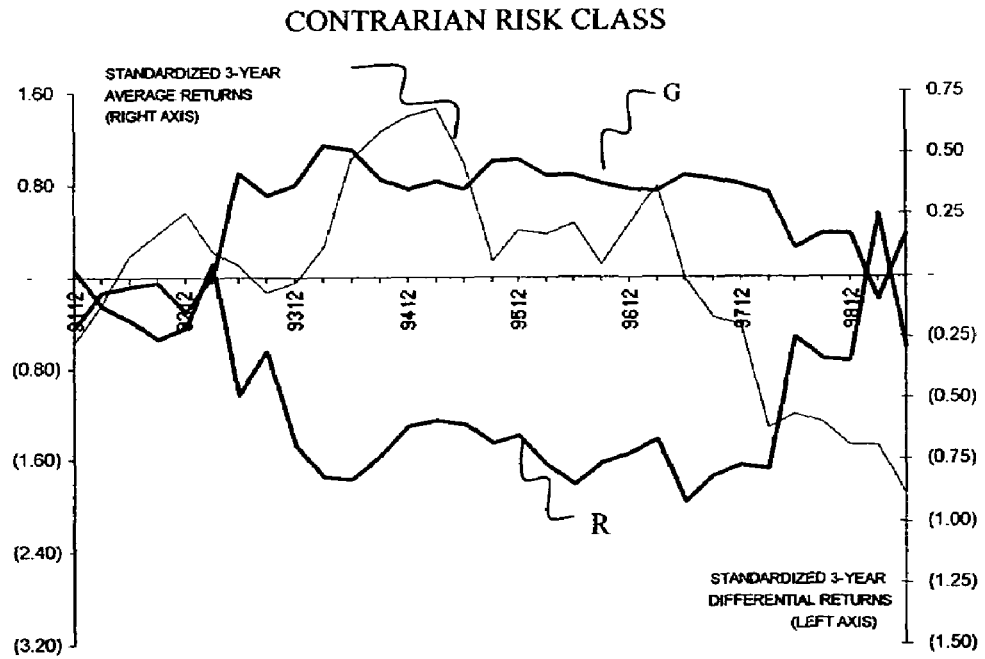
FIG. 8 is a graph demonstrating that for an alternative population of alternative investments made from funds investing in foreign equities, the relative average investment performance of alternative investments selected as members of either the strong or weak sections in a series of prior evaluation periods will be cross-cyclical to the average investment performance of that population of investments in a series of subsequent selection periods.

An asset class made up of funds investing in foreign and precious-metal equities is constructed, and those investing in fixed-income securities (Contrarian and Average asset classes, respectively). Their histories over this analysis period, as shown in FIG. 7 and FIG. 8, are additional confirming evidence of the cross-cyclical nature of fund asset-class populations when sectioned by a market line For the analysis of these other asset classes, the performance of the class groupings are compared to a common curve denoting the relative strength of general market conditions over the analysis period. This curve is constructed by standardizing the population of successive 3-year returns calculated each quarter for each asset class and then taking the quarterly average across the (4) risk classes. The history of successive 3-year selection-period standardized differential returns for each grouping in each class selected as among the class population performing above the market-line or below the market-line for successive prior 5-year evaluation periods is compared to this curve. The fit of the lines indicates that the cross-cyclical nature of asset-class groupings is a phenomenon that operates from changes in general market conditions, rather than from the more limited case involving the peculiarities of a specific securities market sector.

This perspective of the cross-cyclical nature of differences found in the future performance of funds selected on the basis of their past investment performance relative to an asset-class market line is, of itself, unique and novel. There exists no other reference in the academic or industry literature to the possibility of this cross-cyclical nature of an asset-class populations or its probable cause.

The implications of the analysis outlined above to an evaluative process, in accordance with the present invention, are as follows:

i. The relative future performance for the (G) population—that grouping of funds whose relative performance puts them above the market line in a past period—is positively correlated to the strength of its market in that future period. The performance of those funds that were evaluated as strong in a prior period remains strong relative to their peers in a subsequent future period, if market conditions in that future period are strong. Their future performance weakens relative to their peers when market conditions is a subsequent period weaken.

ii. The future performance of the (R) population—that grouping of funds whose relative performance puts them below the market line in a past period—runs counter-cyclical to the future strength of its market in a subsequent period. The performance of those funds evaluated as weak in a prior period rises to be strong relative to their peers, if market conditions deteriorate in that future period.

iii. Over the course of a market-cycle—a time period that contains both strengthening and deteriorating market conditions—neither population grouping (with the exception of the biggest losers of a prior period) produces an average differential return that is different from zero (average standardized differential return of +0.06 at a confidence level of 86% for the evaluation-period (G) population, and of (−) 0.11 at a 88% confidence level for the evaluation-period (R) population within an asset class of funds investing in domestic equities ('subject asset class') for the selection period December 1994-June 20002 ('subject analysis-period').

iv. Assuming financial markets will continue to operate in cycles, it makes equal sense, as a general rule, to hold investments that reside in either the evaluation-period (G) or (R) area, and if one was not predisposed to guessing the future direction of a market, to hold investments in both.

These implications indicate that the process to verify the cross-cyclical nature of a fund asset-class population is, of and by itself, of limited use in evaluating ones holdings, unless one has special knowledge of future market conditions, and unless those market conditions undergo and extraordinary change. There exist a plethora of industry practitioners who feel they possess this special knowledge, and for these practitioners, this limited insight will have economic value.

For the investor not in possession of this special knowledge and concerned with evaluating their investment selections at the asset-class level, this initial process of identifying counter-cyclical population groupings has the following limited application.

If ones asset-class holdings are performing below the asset-class average-residing in the evaluation-period (R) area—it is illogical to expect that a rising market will cause them to perform better than that asset-class average in a future period. The relationship between an investor and their investment manager is one largely built on trust and confidence. If an investor's manager reports that the portfolio holding within an asset-class is under-performing its average and that he expects its performance to improve relative to its peers solely because of improving market conditions (a common theme of disciples of market timing and contrary selection processes), such a claim would be a cause for investor skepticism as to either the manager's fidelity or expertise.

The present invention provides a unique process to evaluate a fund based on the relative strength of its past performance. It is convention to evaluate a mutual fund in terms of the average performance characteristics of the group of funds to which it belongs. This convention stems from the fact that the future path of a fund in subject to the individual actions of its investment manager. This places the analysis of that future path into the realm of the behavioral sciences, where the effects of free will and differences in individual perception makes the future paths of individuals within a population understandable only at a higher level of aggregation—one must group similar individuals to reveal a trend through the average of their actions.

In terms of evaluating a fund based on characteristics of its past-period performance relative to its asset-class peers, such an evaluation process is quantified in terms of the average future performance for a group of funds within that class whom have uniquely similar past-period characteristics and to which this fund may belong—the average future performance for a group of funds with the strongest and those with the weakest performance, with the highest or lowest average return, or that had either the most volatile and least volatile periodic returns during a past period, as examples.

Using the result of an average performance for a group as the evaluative measure for each member of that group requires that the group average be representative of the future performance characteristics of each member. The variance among the members of that group, in terms of the measured future performance characteristic, must be significantly smaller than that between each of the groups, if the computed average is to be a practical measure for portraying the characteristics of the group and differentiating one grouping from another.

This is the same type of problem on the narrow scale of groupings within an asset class that Dr. Markowitz ran across on the broader scale of creating asset class groupings within a financial market. Dr. Markowitz solved for the problem by a constructive process, creating his groupings at the initiation of his process as populations of investments that were uniquely similar in terms of their past pattern of periodic returns. Notwithstanding this preemptive measure, it was not until the confirming rationale of the CAPM was created and accepted that practitioners had any real confidence that the allocation strategies crafted from the analysis of the average performance characteristics for an asset class could be taken as valid representations of the efficiencies to be obtained once those strategies were implemented using individual investments.

The insight of the method of present invention is that there exist broad groups of investments within an asset class, when defined by differences in past-period investment performance characteristics, whose relative strength of future investment performance will be cross-cyclical introduces a structural limitation to the segmentation strategies employed in dividing that asset-class population into groups for evaluative analysis. Any grouping strategy that includes significant portions of both cross-cyclical groups within a single grouping will create an evaluative measurement that is of little or no value, because its computation as a group average will be compromised by the inclusion of members whose individual measures of investment performance will be, by definition, highly variant and offsetting in any portion of a market cycle.

In operational terms, the relevance of the insight is that any evaluative process based on past performance must include as its initial step a method for separating the members of an asset class into groups whose relative future investment performance will be, on average, most cross-cyclical to one another.

The method of the present invention is outlined in detail below. The first four process steps relate to procedures for finding the point of separation within asset class populations that will create (2) groupings of investments whose future relative performance can be expected to be cross-cyclical. The last four steps are grouping procedures to enhance the level of evaluative definition. They work in conjunction with the process for separation of cross-cyclical groups.

1. Process to Verify Adequacy of Market Benchmark and Analysis Time-period

Cross-cyclical differences in the relative strength of investment performance between members of an asset class can only be viewed over a time period in which the market underlying that asset class undergoes a cyclical change.

The measurement of the cross-cyclical nature of performance is calculated in terms of the correlation of the pattern of average differential returns for a group with the pattern of average return for the market around its time-period average. If the term of the analysis period is too short to indicate a market cycle, the analysis of performance differences will not reveal a cross-cyclical pattern that can necessarily be proven to be statistically significance.

A series of average-returns are calculated from a series of consecutive periodic returns of equal length for an asset class population. For the analysis of this invention, 3-month returns are used as the series of periodic returns and the geometric average over a series of 3-year terms as their average return. For the example outlined in this paper, these 3-month returns are the average 3-month returns for an asset class population of mutual funds with at least five-years operations that invest exclusively in the domestic equities markets—the subject asset class.

Figure 9:
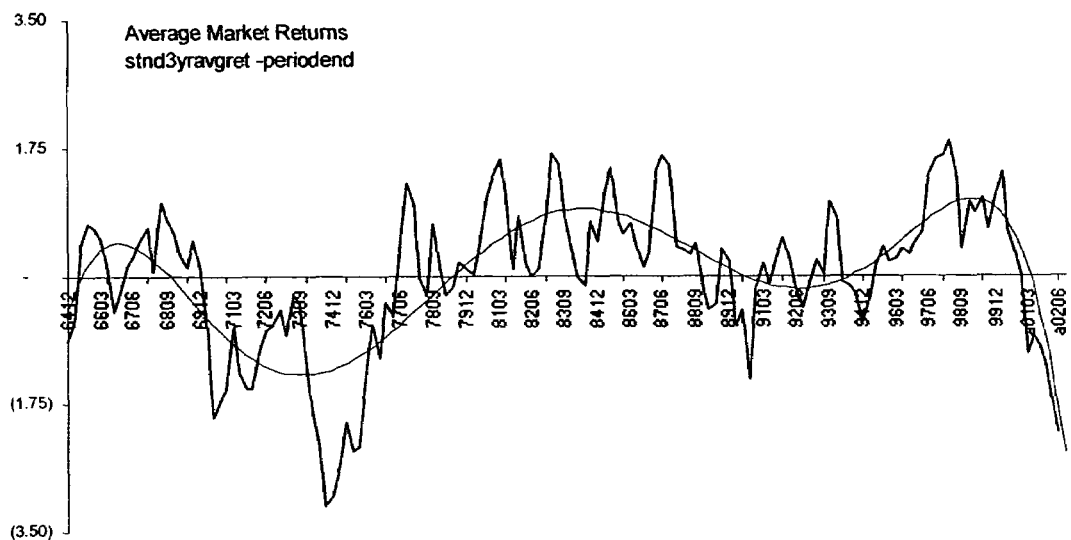
FIG. 9 is a graph showing the cyclical nature of the market underlying the subject asset class population as demonstrated by the pattern of average market returns on a timeline made of successive 3-year average returns for that asset class population since 1964.

The time period for which this series of 3-year average-returns are tabulated extends from 1961-2002. The 3-month periodic returns for this class extending from January 1961 to June 2002 are combined into a series of 3-year average returns calculated for each of the 151 quarters in that time period, the range of the ending dates for these 3-year terms extending from January 1964 to June 2002. Those 3-year returns are standardized against their time-period average and plotted against a time scale on FIG. 9.

Figure 10:
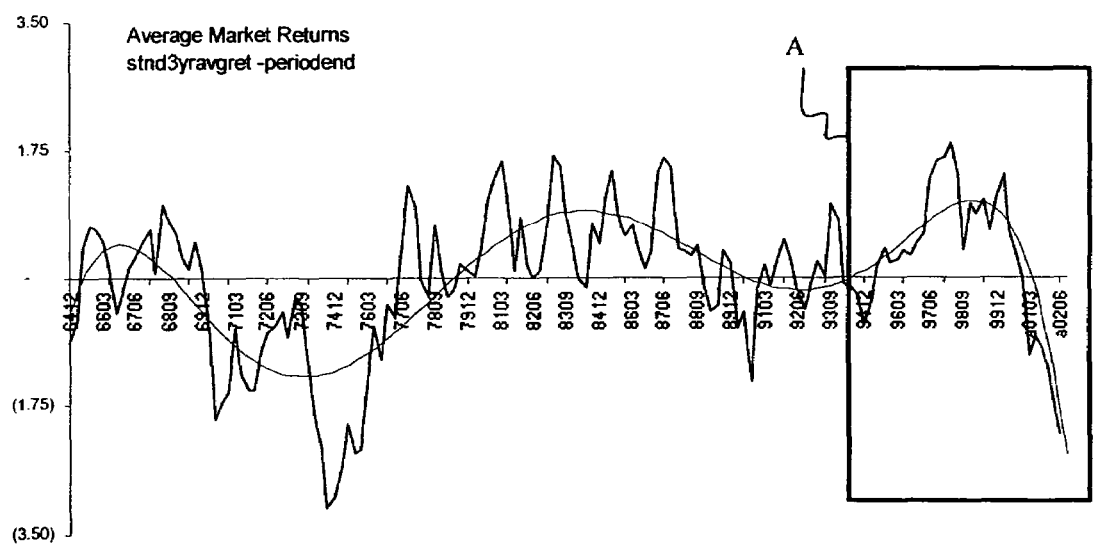
FIG. 10 is an analysis of the graph of FIG. 9 showing average market returns on a timeline made of successive 3-year average returns for the subject asset class population and marking the subject time period used in the analysis of the investment processes as the series of 3-year analysis periods ending 1994 to 2002

The resultant curve reveals several time periods between 1964-2002 when the market underlying the asset class proceeded through a market cycle—a trough to trough progression of the series of 3-year average returns. The analysis periods December 1964 to December 1973, December 1973 to June 1993 and December 1993 to June 2002 are examples of these cycles. The analysis for this invention is based on the cycle of 3-year periods whose ending dates are from December 1993 to June 2002—as marked within a box labeled analysis period (A) in FIG. 10.

2. Process to Calculate the Relative Investment Performance of Members of an Asset Class Under the tenets of the CAPM, relative investment performance is measured against an asset class average that is calculated as a linear relationship between a point of zero risk and the point of average risk and return for the asset class. This relationship can be visualized as a straight line originating from a point of zero risk along the y-axis of a mean-variance graph, that transverses the length of risk resident in the asset class and that intersects the point of average for the average of periodic returns and variance of periodic returns for the class population, as shown in FIG. 11.

Figure 11:
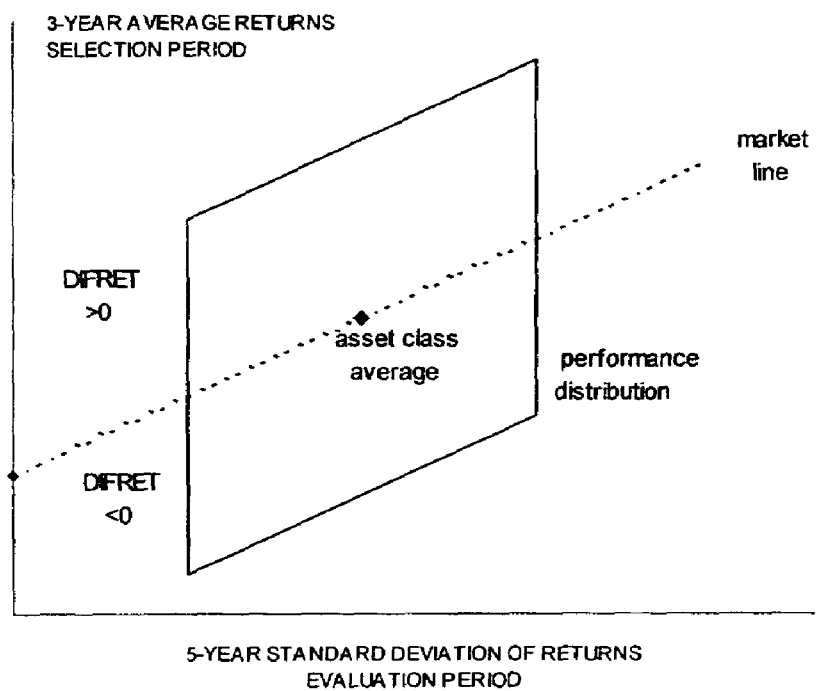
FIG. 11 is a graph showing the method used within the analysis of the processes for this invention for identifying differences in investment performance among a population of alternative investments.

Still referring to FIG. 11, groupings of investments are made on the basis of investment performance characteristics tabulated for a series of evaluation periods within the subject analysis period. The investment performance for each of the members of a grouping is calculated for each subsequent selection period within the analysis period. A market line is drawn for each selection period. That market line is a function of the investment risk within the class each evaluation period and the average returns for the class each subsequent selection period.

The vertical distance from that market line, as represented on a mean-variance graph, is an investment's differential return, and is the quantification of the strength of an investment's performance relative to the class average for the selection period. The investment performance for the groupings each selection period is the average of the investment performances of the member of each grouping.

The vertical distance between a fund's calculated average return and this market line is the fund's incremental investment return either above or below the class average and is characterized as its investment performance relative to the class average. This incremental investment return is called a fund's 'differential return' if investment risk is calculated as the standard deviation of each fund's periodic returns around their average. It is a fund's 'alpha', if investment risk is calculated as the covariance of a fund's periodic returns with those of the asset class average relative to the variance of that asset class average—('beta').

In an asset class constructed under the tenets of MPT, the measures of differential return and alpha are essentially identical. This invention has been tested only for asset classes constructed under MPT and it has been verified that the processes outlined using either measure generate identical results.

In accordance with present invention, evaluative periods of 5 years duration are constructed with the expectation that the results of the evaluation analyses will remain valid for a subsequent 3-year 'selection period'. Thus said, the analysis underlying the proof of this invention entails the calculation of differential returns for the subject asset class over a quarterly series of (31) 5-year evaluation periods ending December 1991 to June 1999 and (31) 3-year selection periods ending December 1994 to June 2002.

3. Process to Validate the Cross-cyclical Nature of an Asset Class Population

It makes no sense to base an evaluative procedure on the initial grouping of an asset class population by dissimilarities the cyclical behavior of relative differential returns unless such a condition exists. This premise of this invention is that these dissimilarities are a pervasive condition of an asset class population. Thus said, the bisection of the performance distribution for an asset class population by a line through its point of average return and risk should reveal this structural characteristic, regardless of the angle at which that bisection is drawn.

In practice, the extent of cross-cyclical performance between two halves of an asset class population varies with the slope of the line drawn through the point of average return and risk for the asset class and the relationship of that line to the point of risk and return for a riskiness investment. The position of a point representative of the class average performance is different relative to a point of performance for a riskless asset for every asset class and for most evaluation periods. This condition introduces a variance in the any procedure to prove the consistency of cross-cyclical groupings within an asset class—a variance that has to be eliminated.

The process of the present invention for eliminating this variance is to standardize the process of proof to a procedure of bisecting an asset class performance distribution at the point drawn through of average risk of the class across the range of average returns resident at that point in the class. On a mean-variance graph, this bisection appears as a vertical line through an asset class distribution running through the point of average risk for the class. This division line represents the most neutral bisection strategy available in light of contingencies to a proof identified above.

Figure 12:
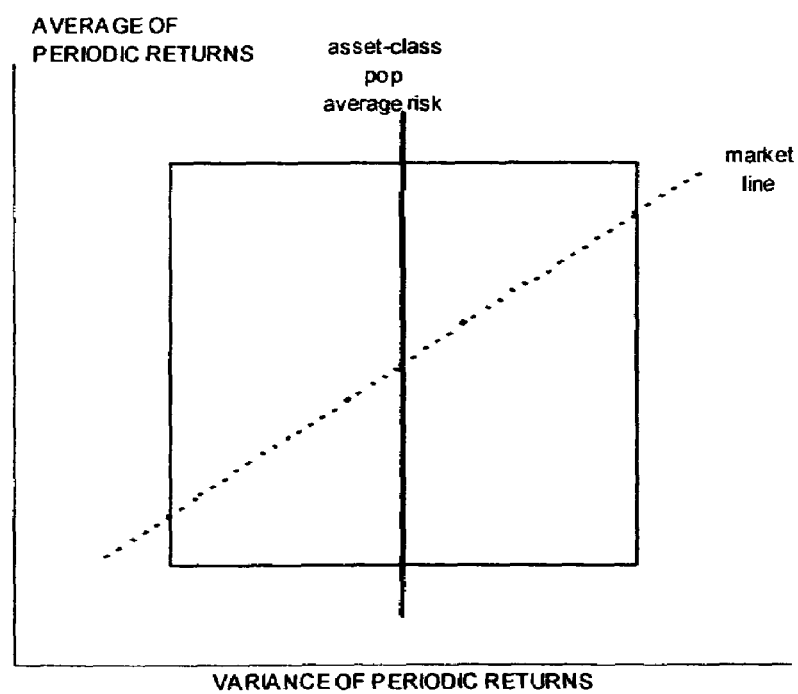
FIG. 12 is a graph showing the method used for bisecting a population of alternative investments through the point of average risk for that population in regards to the analysis of the processes for this invention for testing the existence of cross-cyclical sections.

There will exist more clever and subtle analysis procedures available at a point in the future when the dynamics of this contingency are better understood. The present method has the advantage in being a very simple and straightforward solution to the problem, as well as a methodology that illustrates well. FIG. 12 shows the results of a procedure to divide an asset class population into halves through the point of average risk in terms of a mean-variance graph to validate the legitimacy of the assumption that there exist cross-cyclical populations within an asset class, the performance distribution for that class is bisected by a line through the point of average investment risk each evaluation period within an analysis period.

For this bisection procedure, the investment risk for each of the members of an asset class is calculated for each evaluation period within an analysis period. The average risk present in the asset class is calculated for each evaluation period and the members of the asset class are placed in one of two groups ('groupings') depending on whether their investment risk in each period is less than or greater than the class average.

The performance of each member of each evaluation-period population is followed for a subsequent 3-year selection period. The differential return for each surviving member of the class is calculated at the end of each selection period. In the analysis, this generates (31) successive measurements of relative investment performance among the members of a class for the quarterly selection periods from December 1994 to June 2002.

Figures 13A, 13B:
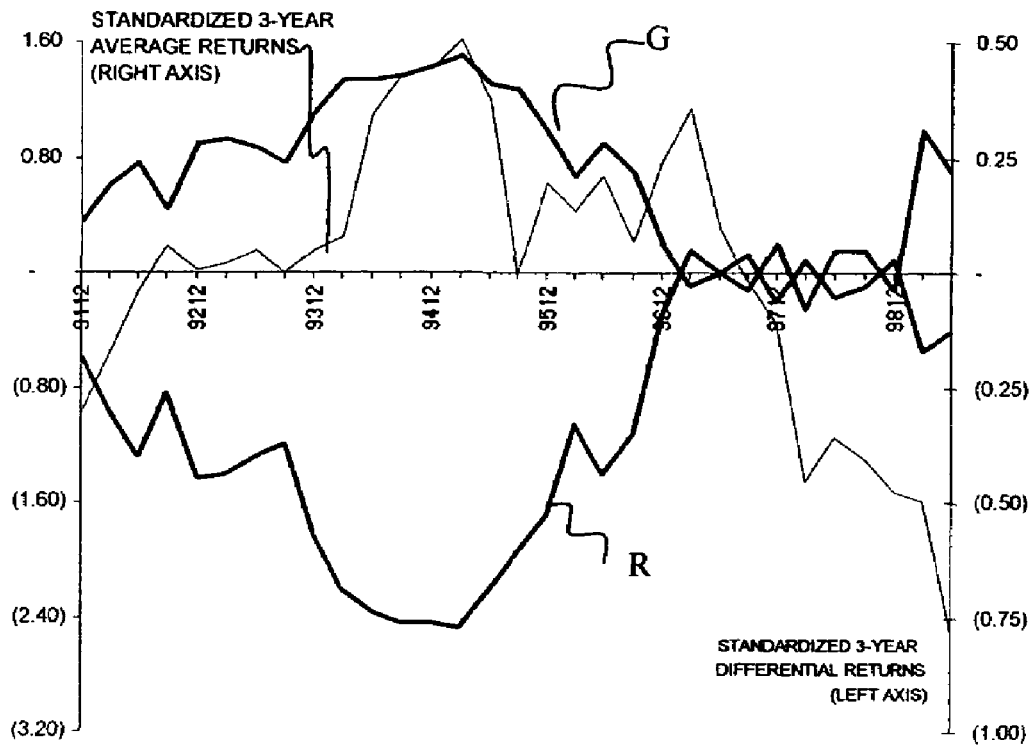
FIG. 13A is a graph demonstrating that for the subject population of alternative investments used for the analysis of the processes of this invention, the relative average investment performance of alternative investments selected as members of sections created by the bisection of the population by the point of average risk for the population either in a series of prior evaluation periods will be cross-cyclical to the average investment performance of that population of investments in a series of subsequent selection periods.
FIG. 13B is a table used for calculating the coefficient of correlation between the average return for a population of alternative investments for a series of selection periods and the relative investment performance over that series of selection periods for two sections of that population created by the bisection of the population over a series of evaluation periods at the point of average risk for the population in those evaluation periods

The differential return for each member for each selection period is standardized around the asset class mean differential return and an average is taken for the standardized differential returns of the members of each grouping for each period. That average is plotted against the series of average-returns calculated for the asset class—the results shown as FIG. 13A with the correlation coefficient data shown in FIG. 13B.

To measure the cross-cyclical nature of the average differential returns for each group, a correlation coefficient is calculated between the pattern of asset class average returns and the pattern of group-average differential returns. The process of calculating a correlation coefficient is scaled, by convention, so that a coefficient of '1.0' indicates a perfectly synchronized match in pattern, a coefficient of '(−)1.0' indicates a perfectly contrary and offsetting match in pattern and a coefficient of '0.0' indicates no correlation between patterns over time. The convention within the behavioral sciences is to assume that a coefficient greater than +0.5 or less than (−)0.5 indicates a significant correlation relationship. The correlation coefficient for the two groups divided by a line through the average risk for the subject asset class with the average returns for that class is +0.72 and (−)0.73 respectively.

4. Process to Maximize the Dissimilarities of Correlation with the Average Returns of the Asset Class Between Two Groups Created by the Bisection of the Distribution of Investment Performance within an Asset Class Having concluded that it is important to make an initial division of a distribution of investment performance among members of an asset class in terms of the expected dissimilarities in the correlation of their differential returns in a future period, and having determined that a subject asset class reveals a strong potential for such cross-cyclical behavior, it becomes important to ensure that the division decided upon will maximum the cross-cyclical characteristics of the groups created by this initial division.

There will exist more subtle and clever procedures for determining this maximum—perhaps an algorithmic solution in the future. This process uses a rather simple device to test for this maximum. Having computed a market line for an asset class population for their evaluation period, a 'market return' is calculated for each fund within the asset class and assigned to each fund record. This market return is the average return resident on the market line at a point of risk equal to that of each fund. This is a conventional measure that is intrinsic to the calculation of a fund's differential return. The assemblage of market returns from each fund form the market line for the asset class that runs from a point of zero risk, through a point of average risk and return for the class and across the breadth of risk resident within an asset class.

Next, the class average of average returns for the asset class is appended as calculated over the evaluation period to the record of each fund. The assemblage of the average-average returns assigned to each fund form a line through the point of average risk and return for the class and across the breadth of the risk within an asset class ('average-return line'). On a mean-variance graph, this line appears as one that runs parallel to the x-axis.

Except in extraordinary circumstances, the slopes of a market line and average-return line for an asset class are different. By combining the market returns and average-average returns for each fund in the formula listed below, one can model a plethora of alternative 'division lines' that bisect an asset class by a straight line that traverses the class and passes through the point of its average risk and return. Such alternative bisections are the assemblage of the 'dividing-line return' for each fund—the average return for a point on the calculated division line at a risk equal to the risk of each fund over the evaluation period.

$$[\text{dividing-line ret.}]=[\text{market-ret.}]-(([\text{market-ret.}]-[\text{average-average ret.}])*\text{constant}\{K\})$$

With this formula, a set of alternative bisecting division lines of varying slopes can be created by changing the constant. For example, setting the constant equal to k=1 recreates the average-return line; setting the constant equal to K=0 recreates the market-line.

Each of these bisecting lines is used to group an asset class population into two halves in each evaluation period within the analysis-period. The correlation coefficient for the average standardized differential return for each group is calculated over the series of selection periods within the analysis period to determine which of the modeled division lines generates the most dissimilar patterns of future period performance. This line generating the maximum result is assumed to determine the characteristic initial division of an asset class population that will produce the most accurate evaluative grouping based on correcting for the cross-cyclical nature of asset-class population investment performance.

Figures 14A, 14B:
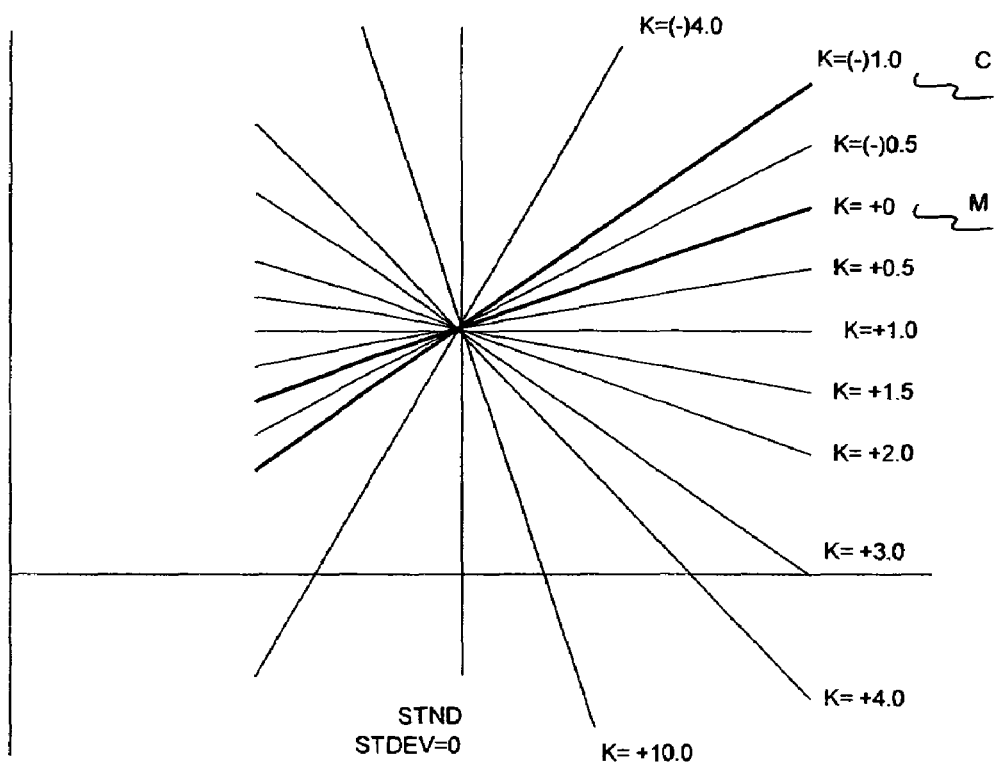
FIG. 14A is a graph of the alternative strategies for bisecting the subject population of alternative investments used for the analysis of the processes of this invention by finding the correlation axis of the population in accordance with the method the present invention.
FIG. 14B is a table of the correlation coefficients for the sections created by these alternative bisection strategies for finding the correlation axis in accordance with the method of the present invention.

FIG. 14A illustrates this process for the subject asset class. For each line modeled, it has been indicated that the constant used and the correlation coefficient for the population halves located above and below that line for the subject analysis period. The correlation coefficient data is shown in FIG. 14B.

The division line drawn to bisect the subject asset class and producing the most dissimilar groupings is one of somewhat higher slope than the asset-class market line (M) over the analysis period. This line is formed using the constant K=(−) 1.0 and is identified in FIG. 14A as (C). This division line is assumed to be the 'correlation axis' for the asset class and is forms the first criteria for segmenting the asset class population in subsequent evaluation periods for the purpose of creating groups of funds that are assigned a value based on their expected performance relative to their asset class in a subsequent selection period.

5. Process to Provide Sharper Definition to the Groupings Formed to Indicate Asset Class Populations Whose Future Investment Performance Relative to the Class Average Will be Different Having accommodated the issue of cross-cyclical populations, each bisection group can be further divided using a variety of strategies. The purpose of an evaluative system is to create groupings whose differences in future investment performance will be greatest and most consistent over market cycles. Thus said, the strategy with the greatest potential for improving upon the utility of an evaluative system initiated as a division of counter-cyclical populations is one that further divides the class members into groups whose future strength in terms of investment performance will be consistently different.

The issue with any grouping strategy employed in implementing this objective is the same as it was for the correlation grouping—the future differences among the members of the group must be significantly less different than the differences between group averages for the evaluation to have a practical purpose. To solve for this issue, I use the same procedure as used for identifying the most efficient division between cross-cyclical groupings—I model a series of bisecting division lines for each evaluation-period asset class over the analysis period, calculate the average standardized differential return of each half in each selection period and select for the division line that results in the greatest difference between the two halves in terms of the size and consistency of their selection period average standardized differential return.

This modeling process uses a series of iterations generated from the same equation used for the cross-cyclical analysis. A series of lines are drawn through the point of average risk and return for an asset class by plotting the population of the dividing-line returns for each of the class members—each line in the series calculated by varying the constant in the equation:

$$[\text{dividing-line ret.}=[\text{market-ret.}]-(([\text{market-ret.}]-[\text{average-average ret.}])*\text{constant}\{K\})$$

This line is used to divide an evaluation-period population in halves. The average standardized differential return is calculated for each half for each selection periods within the analysis period and these averages compared both on the size and consistency of their differences. The objective of this step in the process is to identify that bisection where the future performance difference between the two groups is most consistently dissimilar—the 'performance axis'.

Figures 15A, 15B:
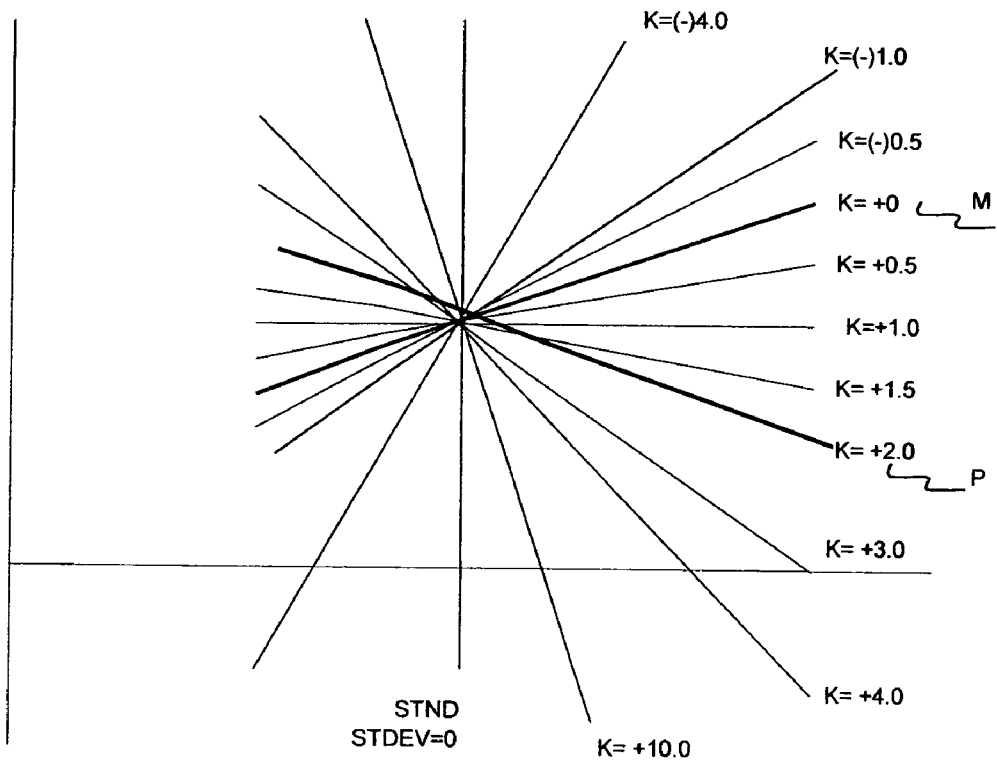
FIG. 15A is a graph of the alternative strategies for bisecting the subject population of alternative investments used for the analysis of the processes of this invention by finding the performance axis of the population.
FIG. 15B is a table of the future-period efficiency ratios for the sections created by these alternative bisection strategies for finding the correlation axis as demonstrated by the graph of FIG. 15A.

For the subject asset class, by way of example, that performance axis, for the subject analysis period, is a division line that is the mirror image of the line defining the market line (M). This performance axis exists at constant K=2.0—as shown in FIG. 15A as (P) and with data shown in the table of FIG. 15B. This relationship with the class market line may or may not be a specious, and the preferred procedure is to independently model this performance axis for each asset class and analysis period encountered, rather than to rely on this mirror-image phenomenon to define a performance axis.

In the most simple and direct of evaluation schemes, the performance distribution for an evaluation-period asset class is divided to differentiate between that grouping of funds whose future performance will either be stronger (green (G)), weaker (red) or indistinguishable from (yellow (Y)) the class average in the subsequent selection period. In determining a suitable grouping strategy toward this end, the pattern one wants to witness over the course of an analysis period is that these performance differences identified between these groupings and the class average performance remain constant over the course of a market cycle. This objective can be translated to a set of general criteria for the behavior of each grouping as follows:

For that group of funds identified as 'green (G)', their standardized differential return must be not only positive as an analysis-period average, but must also be consistently positive through the series of selection periods, regardless of market conditions.

For that group of funds identified as 'red (R)', their standardized differential return must be negative as an analysis-period average as well as consistently negative throughout the series of selection periods.

For the group of funds identified as 'yellow (Y)', their standardized differential return must be both insignificant, as an analysis period average, as well as insignificant through the series of selection periods.

For all groupings, the correlation coefficient with regard to the market cycle must be either significantly negative or positive. Any of grouping schemes that result in a weak correlation of differential returns with the average returns of the asset class over the analysis period indicate a group made up of dissimilar individuals and the potential for a misread of individual behavior as proxied by the calculated average. This reading indicates the need to either modify or add to the correlation division strategy in order to separate out disparate members within the grouping.

As a practical matter, this performance consistency cannot be considered to ever be perfect. Regardless of how rigorous the consistency is tested by the range of market conditions witnessed for an analysis period, there is always the possibility of greater variance at a point in the future—a variance that will overcome the characteristic relative performance of the grouping.

Therefore, any evaluation system is a reflection of chance and probability. The efficiency of its grouping scheme must be recognized in that light, and an evaluative system must always be offered in conjunction with an explicit statement of its probable outcome. This statement must be made from explicit benchmarks for the expected differences between the behaviors of group averages—benchmarks that can be used by investors to judge the continued relevance of the grouping scheme. These benchmarks must be in the form of quantifiable measurement criteria.

The basic measurements that reflect the quality of a grouping scheme are the analysis-period average and analysis-period standard deviation of the standardized differential returns for each grouping created. A comparison of an analysis-period average for standardized differential returns for each group will reveal the magnitude of the expected performance differences between groupings. The calculation of the standard deviation of the standardized differential returns for each group around its analysis-period average will indicate the consistency of these differences over the course of a market cycle.

These (2) basic measurements are used to generate conventional measures of statistical significance. The statistical measure of 'confidence level' is a common benchmark by which to judge the validity of differences found in groupings of empirical data. It is calculated from the average and standard deviation of a series of measurements taken from a sample and it generates a percentage number that represents the certainty that the differences found in that sample data are real.

A high confidence level calculated for the average of a series of standardized differential returns for a grouping during an analysis period indicates that the investor can expect the average differential return for this grouping—its relationship to the class average performance—to persist into the future. A confidence level of at least 95% is a common benchmark indicating statistically significant differences between groupings within a sample—differences that are assumed to represent certainty. This is the benchmark used to verify that the reasonableness of the evaluative properties of the groupings made with this invention.

In practice, ones wants certainty that the groupings strategy crafted within an analysis period employed to identify green (G), red (R) and yellow (Y) groupings within an asset class population remain valid into the future. This means that one wants to be certain that the average differential returns for the green (G) and red (R) groupings persist on being significantly different than the class average and the average differential returns for the yellow (Y) groupings persist on being indistinguishable from that class average. The statistical measure for this certainty is that the average of the average standardized differential returns over the analysis period for the red (R) and green (G) groupings to test above the 95% confidence level and the yellow (Y) groups below the 95% benchmark.

Another measure that appears to be even more descriptive is the division of the group analysis period average by its standard deviation—its 'efficiency ratio'. For the series of grouping schemes tested, an efficiency ratio of over 1.00 appears to indicate a strong grouping scheme for red (R) and green (G) groupings—yellow (Y) groupings trend toward a ratio of 0.50 or lower.

Along with the measurement criteria from the calculation of the correlation axis—that groupings carry a correlation coefficient of at least 0.50—the benchmark set for evaluative groupings generated from the analysis of the subject asset class and analysis period is as follows:

TABLE 1

| Grouping | Correlation Coefficient | Efficiency Ratio | Confidence Level |
|---|---|---|---|
| Green (G) | >(+) 0.50 | >(+) 1.00 | >(+) 95% |
| Red (R) | <(−) 0.50 | <(−) 1.00 | >(+) 95% |
| Yellow (Y) | <(−) 0.50 or >+0.50 | >(−) 1.00 or <+1.00 | <(+) 95% |

Figures 16A, 16B:
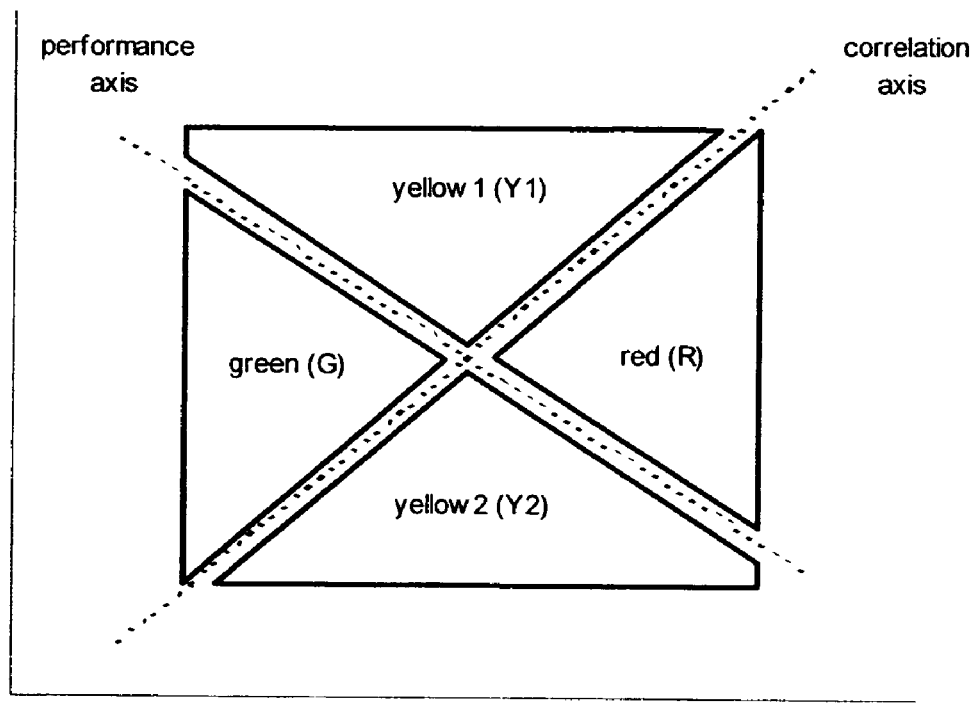
FIG. 16A is a graph of the division of an asset class population into quadrants by a correlation and performance axis generating the greatest difference in the future performance between section groupings.
FIG. 16B is a table of the future-period efficiency ratios and correlation coefficients resulting from these quadrant section populations in the graph of FIG. 16A.

A grouping scheme comprised of (2) lines drawn along the performance axis and correlation axis divides the subject asset class into (4) quadrants that satisfy this criteria outlined above for a simple grouping scheme, as shown in FIG. 16A with data shown in the table of FIG. 16B.

Figures 17A, 17B:
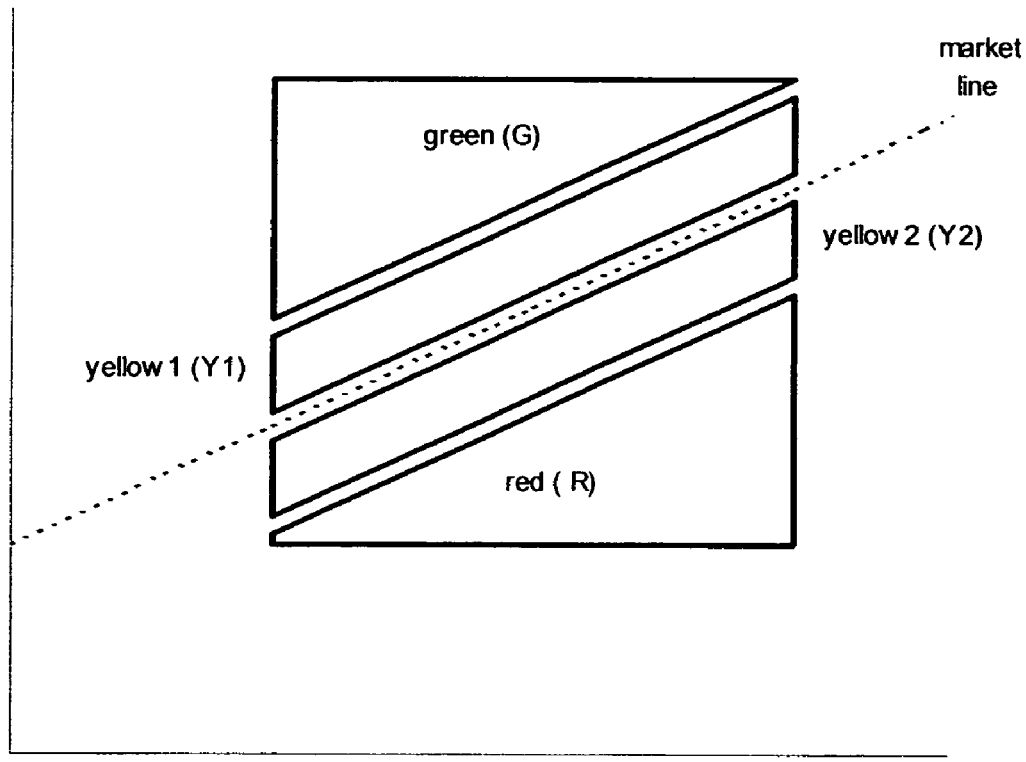
FIG. 17A is a graph of the division of an asset class population into quadrants along the axis of the market line.
FIG. 17B is a table of the future-period efficiency ratios and correlation coefficients resulting from these quadrant section populations in a future time period in the graph of FIG. 17A.

As a point of comparison, the results of this grouping scheme are compared to those of a scheme based on historical research in segmenting an asset class population into quadrants along the axis of its market line, as shown in FIG. 17A with data shown in the table of FIG. 17B. This grouping scheme based on historical precedent does not satisfy the criteria outlined in Table 1 above.

Figure 18:
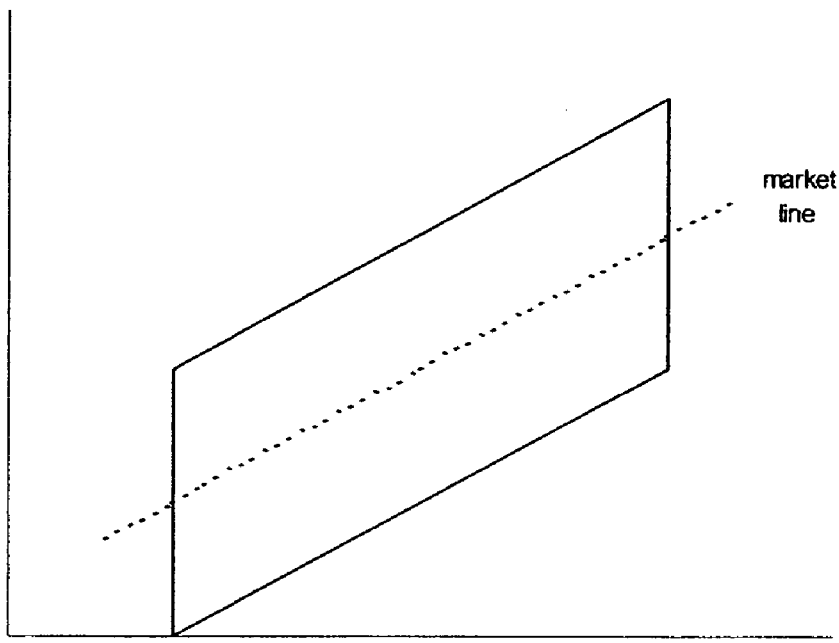
FIG. 18 is a prior art figure representing of the average investment performance for an asset-class population as a market line under the tenets of the CAPM.

6. Alternative Grouping Scheme Based on the Structural Characteristics of Asset Classes of Book-valued Investments It is convention to assume that the distribution of investment performance present within an asset class population conforms to a class average as represented by the class market line. On a mean-variance graph, this assumption can be drawn as a parallelogram whose horizontal sides are parallel to the market line, as in prior art FIG. 18.

Figure 19:
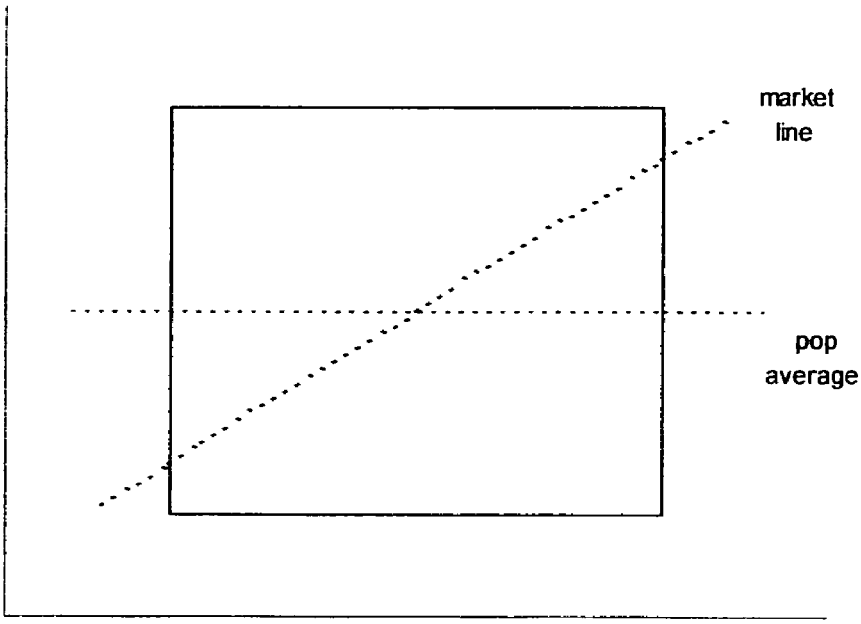
FIG. 19 is a mean-variance graph representing of the average investment performance for an asset-class population as a line drawn through the point of average return for the class and across the range of risk present in the asset class.

Asset class populations of book-valued investments do not conform to this assumption. The distribution of the performances within an asset class population of book valued investments tends to conform to a line representing the class average return—and that tendency increases as the length of the evaluation period increases. As viewed on a mean-variance graph, the performance distribution for a population calculated over a 1-year period will more likely conform to the rising slope of a market line for that period. The performance distribution for a population calculated over a 3 or 5 year period will more likely be congruent with a horizontal line drawn for the calculated average return of the class, as shown in FIG. 19.

Figure 20:
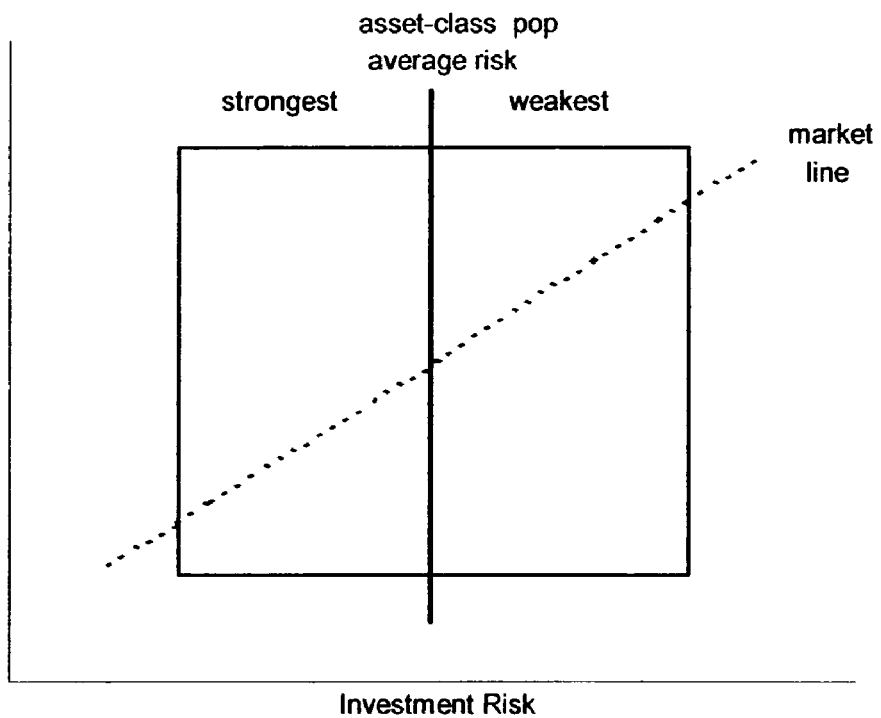
FIG. 20 is a graph showing the characteristic distribution of an asset class population of book-valued investments over time around the risk axis of the population.

As time goes on, the distinction in performance between members of a book-valued asset class become that of risk—not returns. Over a sufficiently long enough period, all surviving funds within a class will generate essentially the same average of periodic returns. Their difference in performance will be based on how volatile those periodic returns were that generated that average. The strongest funds among the class will be found at the left-hand—or least risky—side of the class performance distribution; the weakest funds will be clustered on the right hand—or most risky—side, as in FIG. 20.

This insight of the method of the present invention is unique and novel. Economists have long been frustrated in their attempts to describe the performance distribution of an asset-class of funds using the CAPM market line. Empirical modeling of a market line based on the regression of an asset class performance distribution has consistently resulted in a higher y-axis intercept than anticipated by the CAPM—the distribution of funds around a market line anticipated by the CAPM appears to be skewed.

A number of rationales have been proposed for this phenomenon, the prevailing theme being that it is the result of measurement error due to the quality of available empirical data. The explanation contained in a recent article of *Economic Perspectives*, the economic journal published by the Federal Reserve Bank of Chicago, is emblematic of this rationalization:

"A cross-sectional regression line [for fund data] is a bit flatter than the line drawn through the Treasury bill and market return, but this is a typical result of measurement errors in the betas."[Cochrane. 1999]

What is missing in the analysis behind these rationales is the insight that the performance characteristics of an asset-class of mutual funds, because the class is a type of book-valued market, are characteristically different than that expected by the CAPM. As postulated in MPT, the functionality of investor demand is that investment returns must compensate for investment risk. This demand function is what is modeled by the rising market line of the CAPM. The supply of investments in a market-valued market will follow this rising market line, because investors will continually re-price those investments in line with their demand function—the performance characteristics of the supply of investments within a market-valued market will equal the performance characteristics demanded by investors.

For a collection of market-valued investments, differences in performance among investments dissipate over a short period of time, as investors recognize these differences and, through changes in demand, adjust the price the shares outstanding for these investments. This is a characteristic of an 'efficient market'—and the more freely an investment's share price can react to changes in investor demand, the less time an individual investment's residency off a market-line average exists. Therefore, for investments that exist in an efficient market, one would expect that a cross-sectional regression of their investment performance around an asset-class average to conform to the CAPM.

The mistake economists have made in their analysis of mutual fund and other book-valued investment markets is expecting that these markets will be efficient. In the case of the mutual fund market, it has been created, by regulation, to be a perfectly inefficient market. The share price of a mutual fund does not react to investor demand—a change in demand causes only a change in the number of shares outstanding, and the share price is reflective of only the net asset value of the fund's holdings. It is patently illogical to expect that the performance distribution for a book-valued asset class population—its supply—will conform to an equation that is based on investor demand.

The procedure for capitalizing on this insight to improve the utility of an evaluative system is much like that used for finding the correlation and performance axes in the prior processes. A series of lines dividing an asset class distribution into (2) groups are modeled for the evaluation periods within an analysis period.

The procedure for this is to standardize the investment risk for each asset class member for each evaluation period around their asset class average risk. The asset class population for each evaluation period is bisected by a line drawn form the equation:

$$[\text{standardized investment risk}] = [\text{constant}\{K\}]$$

Figure 21:
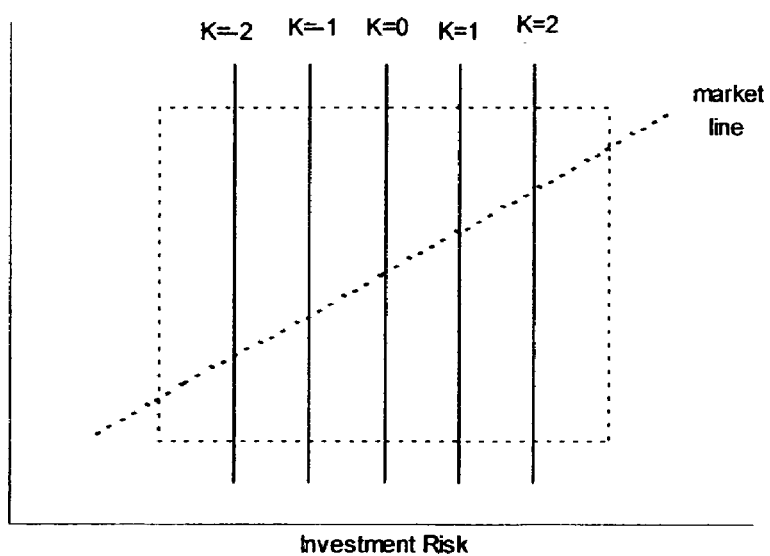
FIG. 21 is a graph showing the alternative strategies for bisecting the subject population of alternative investments used for the analysis of the processes of this invention by finding the risk axis of the population.

On a mean-variance graph, these lines would appear as a succession of vertical lines parallel to the y-axis and running across the range of risk present during an evaluation period for an asset class population, as in FIG. 21.

The average standardized differential return for each grouping is calculated for the selection periods within the analysis period, and the series of these average standardized differential returns tested for the size and consistency of the dissimilarity between the two groups over the course of the analysis period. The dividing line—the 'risk axis'—is determined by the division that generates the largest and most consistent dissimilarity in future performance between the groups.

Figures 22A, 22B:
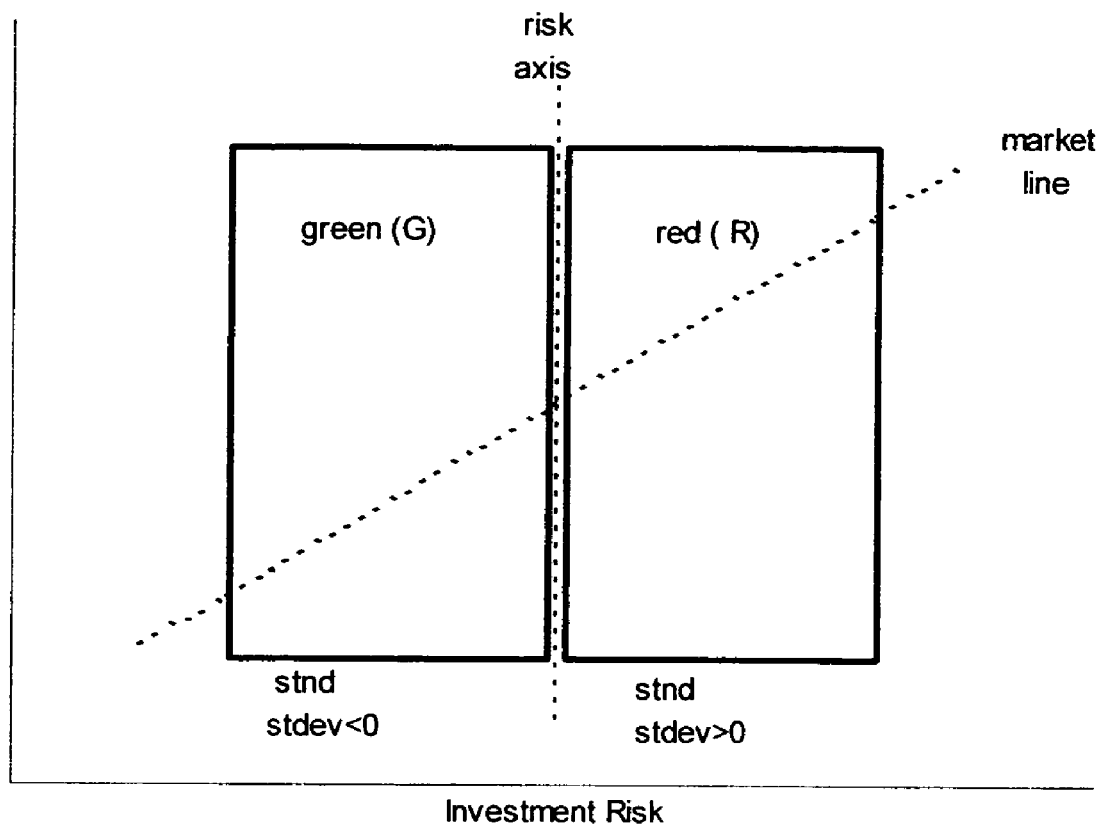
FIG. 22A is a graph showing a risk-axis division line generating the greatest difference in the future performance between bisection groupings.
FIG. 22B is a table showing the future-period efficiency ratios and correlation coefficients resulting from the section populations of FIG. 22A.

For the subject asset class population and analysis period, the risk-axis division generating the largest and most consistent dissimilarity between bisection groups is the one drawn at the point of average risk for the class. This result is modeled in FIG. 22A with data shown in the table of FIG. 22B.

Again, this occurrence of the most efficient risk-axis option appearing at the point of average class risk may be a result that is valid only for this specific subject asset class and analysis period. Thus said, the preferred method of finding the risk axis involves modeling a set of alternative bisections, rather than relaying on a line through the class average.

Figures 23A, 23B:
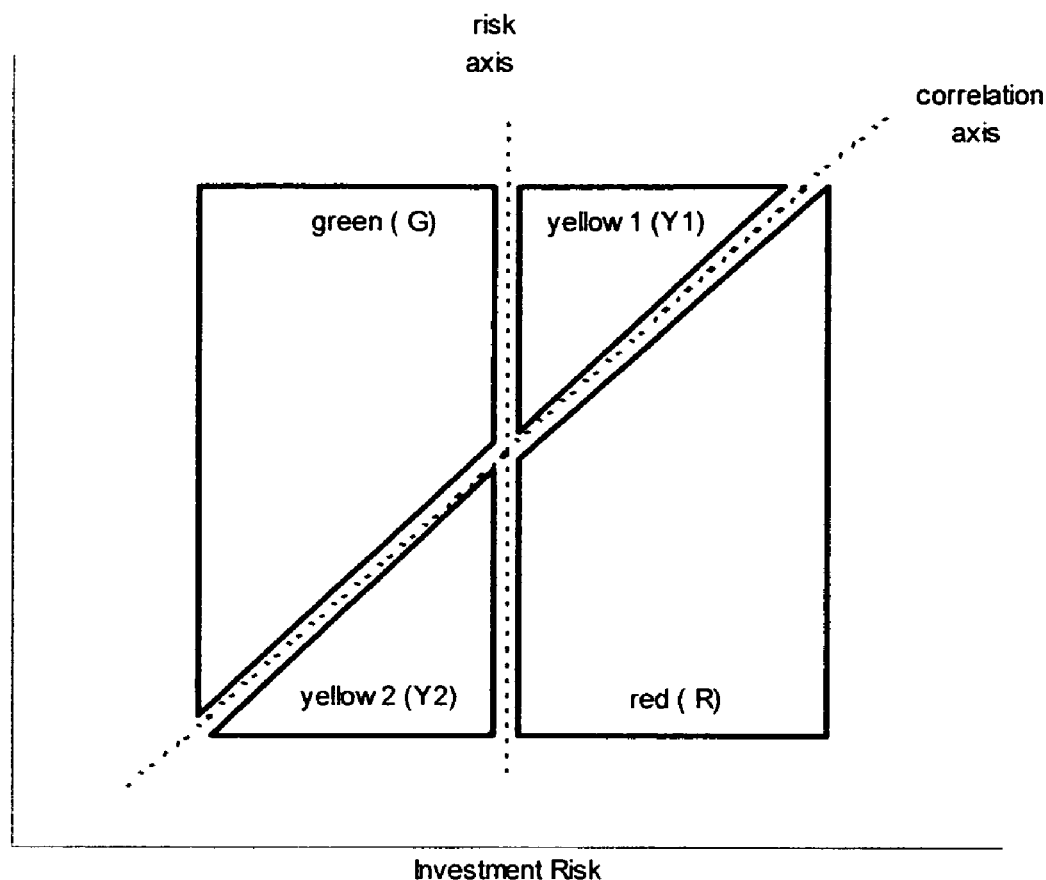
FIG. 23A is a graph showing the division of an asset class into quadrants by a risk and correlation axis.
FIG. 23B is a table showing the future-period efficiency ratios and correlation coefficients resulting from the section populations of FIG. 23A.

The determination of the risk axis can be used in conjunction with the correlation axis to divide an asset class population into quadrants—with level of evaluative definition comparable to that achieved through quadrants drawn using the performance and correlation axes, as in FIG. 23A and data as shown in the table of FIG. 23B.

The division into quadrants using the risk axes solves for a drawback of the aforementioned grouping scheme using divisions made from the performance and correlation axes—the relatively large size of the 'yellow (Y)' population so defined. The yellow areas (Y1 and Y2) are those funds whose future investment performance will be indistinguishable from the asset class average. Investors appreciate certainty, and an evaluative system that can minimize this area of 'insignificance' in favor of identifying larger green (G) and red (R)

groupings—'proven winners and losers'—will be seen as more valuable. Dividing a class population into quadrants creates (2) very small 'yellow (Y1 and Y2)' groupings that remain un-reactive to changes in market conditions. The tradeoff for this capability is that the evaluative definition of the green (G) and red (R) groupings suffers somewhat in quality.

Figures 24A, 24B:
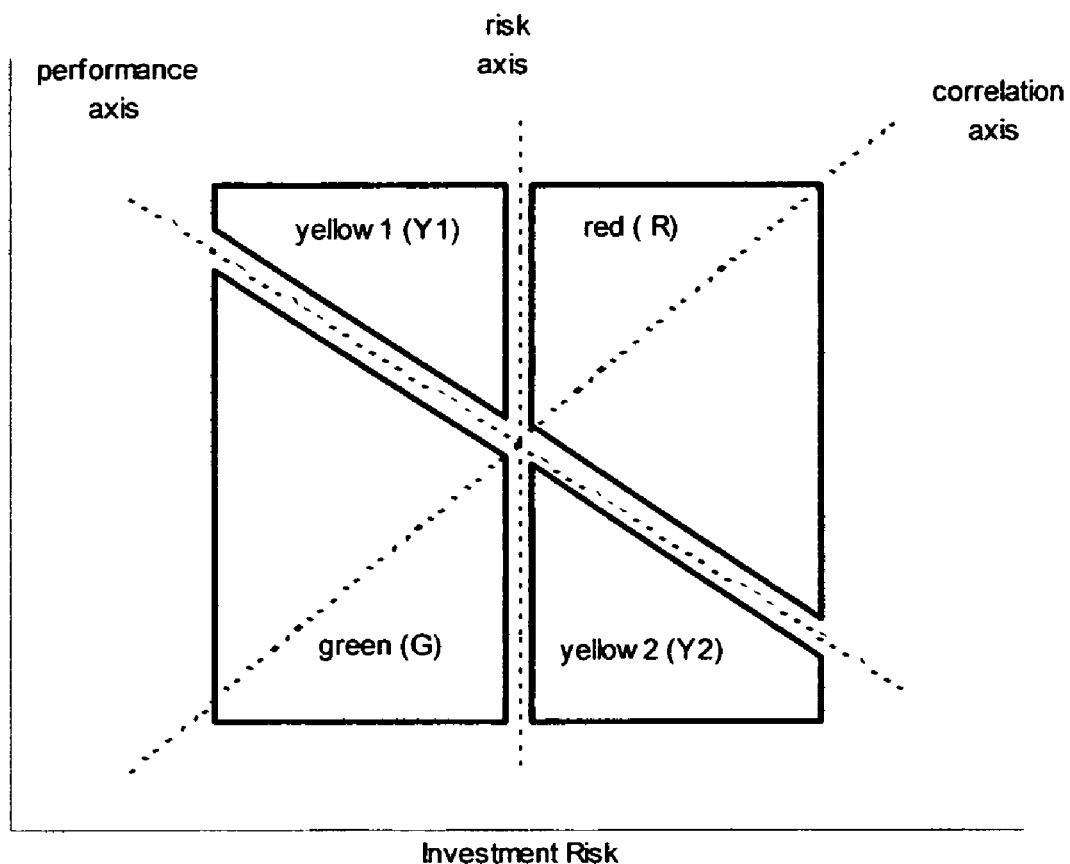
FIG. 24A is a graph showing the division of an asset class into six groupings using the risk, correlation and performance axes.
FIG. 24B is a table showing the future-period efficiency ratios and correlation coefficients resulting from the section populations of FIG. 24A.

The grouping scheme using a risk-axis can be used in conjunction with both the performance and correlation axes to focus on the evaluation of red (R) and green (G) areas, and to minimize the yellow areas (Y1 and Y2), without significantly degrading the evaluative content. This division strategy creates (6) population groupings that are combined into an amended quadrant evaluative system on the basis of common selection period characteristics during the analysis period—illustrated in FIG. 24A and the data shown in the table of FIG. 24B.

7. Alternative Grouping Scheme Built from Small Asset Population Sections

The aforementioned grouping processes all worked from the starting point of the largest possible division of an asset class population—its bisection into (2) parts. Another alternative is to work from small divisions of an asset class performance distribution and combine small contiguous sections of the population so made into larger evaluative groupings based on a successful test for similar future performance characteristics among groups of small sections. This is a 'constructive' methodology, as opposed to the 'deconstructive' methods outlined above.

One could also combine small sections that are not contiguous, but the rationale for that type of discontinuous combination is weak in light of the structural characteristics previously identified. Additionally, one must be able to communicate the findings of an evaluative system in a manner that 'gives a consistent picture' for it to be appreciated by those not possessing an intimate knowledge of subtleties of the evaluative procedure. For these reasons, the preferred process as outlined for this invention assumes the combination of contiguous sections of an asset-class performance distribution.

There exist many alternative methods for making this population of small sections. The method illustrated here is one formerly used in the patent application, "Method for Selecting Investments in Book-Valued Collective Investment Funds"(PN/60342825). The standardized performance distribution for an asset-class population is divided into quadrants based on the distance of each class member from the point of average risk within the population. This division occurs at 0.675 standard deviations below and above this average. Under the assumption that the performance distribution of an asset class is normally distributed, this division method generates (4) areas of equal populations.

Figure 25:
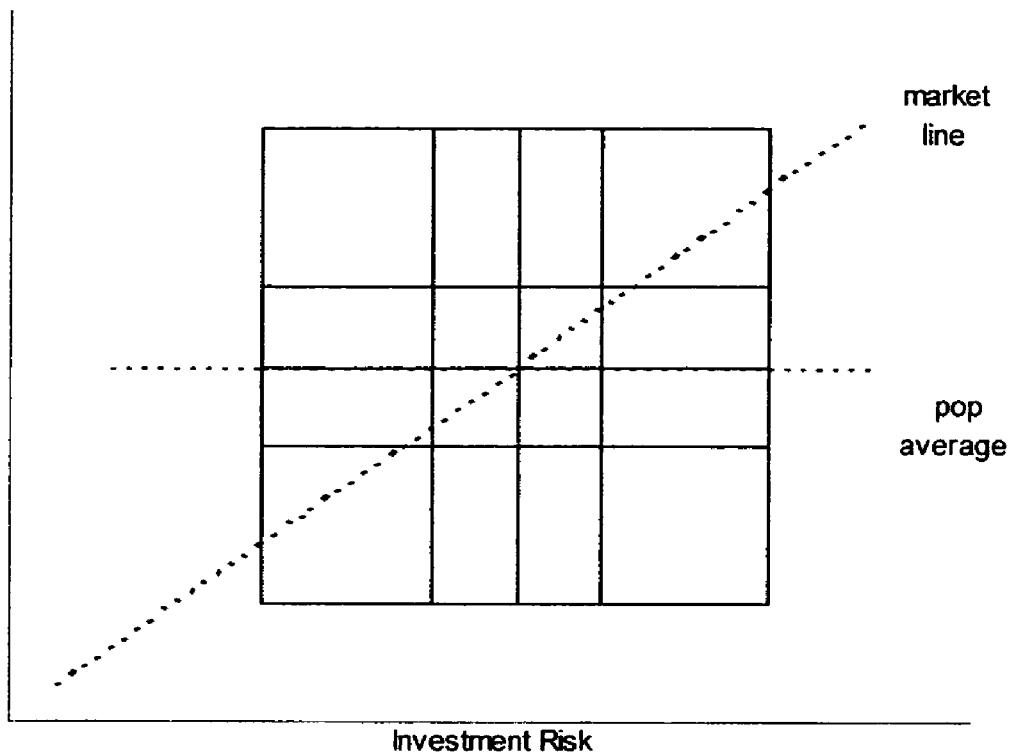
FIG. 25 is a graph showing the division of an asset class population into sixteen groupings of equal population size.

An average return is calculated for the population within each of these (4) areas. Each area is further divided into (4) parts at 0.675 standard deviations below and above this average return. Again, using the conventional wisdom that the performance distribution of an asset class is normally distributed, this further division method generates (16) sections of the asset class population holding approximately 6.25% of the class members each, as in FIG. 25.

This method is used to section the subject asset class population for a series of evaluative periods within an analysis period. The average standardized differential return for each section is calculated for each selection period within the analysis period. Those contiguous sections exhibiting uniquely similar patterns in terms of the correlation, strength and consistency of their average differential returns over the course of the analysis period are combined into either green (G), red (R) or yellow groups (Y1 and Y2).

Figures 26A, 26B:
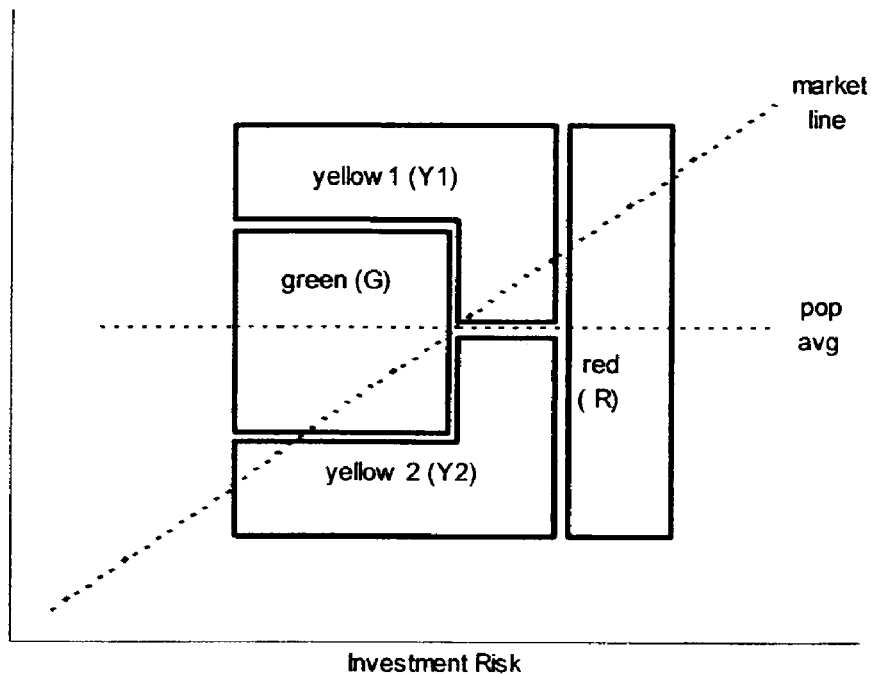
FIG. 26A is a graph showing the division of an asset-class population into four section populations generating the greatest difference in the future performance and made from the combination of the sixteen groupings of FIG. 25.
FIG. 26B is a table showing future-period efficiency ratios and correlation coefficients resulting from the section populations of FIG. 26B.

The evaluative system resulting from this method is shown in FIG. 26A with corresponding data in the table shown in FIG. 26B. The pattern of groupings is roughly the same as obtained by the deconstructive methods outlined previously in this paper. Its groupings conform to the structural characteristics found for book-valued asset class populations. The definition between the groups is a little less rigorous than that achieved by deconstructive methods for this asset class and analysis period.

8. Using the Method of the Present Invention in Practice

The procedures outlined above create an evaluation system. The characteristics of this system are as follows:

i. The value of investments within a book-valued asset class can be compared on the basis of differences in their past-period investment performance.
   ii. This valuation is based on the grouping of investments by division of the distribution of investment performance within the class in this prior period.
   iii. The value assigned is based on the expected average future difference in investment performance between the groupings for up to a subsequent selection period.
   iv. These expected differences among groups can be proven to be statistically significant and to be emblematic of the expected performance of the individual members of those groups across the range of possible market conditions.

The use of this evaluative system is in valuing book-valued investments on a current-period basis. At a date of evaluation (a quarter's ending date, for example), the performance characteristics of a book-valued asset class population are calculated for a prior period ending at the evaluation date (evaluation period). A market line and average-return line are charted and a performance axis, correlation axis and risk axis calculated using the constants formulated in a prior analysis-period in regard to this asset class.

Division lines are drawn by the intersections of these axes, and each investment in the asset class is assigned an evaluation label—green (G), red (R) or yellow (Y)—depending on their position within the groups outlined by these division lines. The label assigned an investment is the expected strength of their investment performance relative to the average of their class for a specified time period into the future (selection period).

Because the identification of constants by which to draw the division lines is a business process (versus a mechanical process), there exists an element of uncertainty regarding the persistence of the assumptions of the underlying conditions supporting the relevance of this process. This uncertainty requires that the provider of the system implement a process to revalidate the relevance of these constants on an ongoing basis.

Such a revalidation process is anticipated to include adding each quarter's selection-period results to the analysis period, once they become available, and using this addition to extend the analysis period. The analysis is re-run on this extended data and the results used to reaffirm the reasonableness of looking for a performance, correlation and risk axis, as well as to re-calibrate, if necessary, the constants used to formulate these axes.

It would be appreciated by those skilled in the art that various changes and modifications can be made to the illustrated embodiments without departing from the spirit of the present invention. All such modifications and changes are intended to be covered by the appended claims.

What is claimed is:

1. A computer implemented method for selecting investments from within an asset-class population of book-valued investments from processes based on differences found in investment performance among the members of that population for a prior evaluation time period to a process that selects investments from within an asset-class population of book-valued investments based on the characteristic differences found in investment performance among the members of that population for a plurality of time periods immediately following a plurality of prior evaluation time periods and reflective of the outcome of selecting for those member investments from the analysis of the distribution of investment performance of that member population generated in those prior evaluation periods, that when plotted on a mean-variance graph of that performance distribution, results in the identification of a contiguous grouping of investments resident at a specific and consistent location within that distribution of investment performance that asset class population throughout the plurality of evaluation periods whose future relative investment performance for the plurality of a subsequent selection period is found to be consistently superior to the average investment performance for the asset-class for those subsequent selection time periods, comprising the steps of:

acquiring, via the computer, and storing in a storage device of a computer, as a data-record, the measurement of periodic investment returns for each member of an asset-class population for an analysis period comprised of a plurality of contiguous evaluation and selection time periods;

verifying, via the computer, the adequacy of the data acquired in that it produces an analysis period of a length of time to comprise a plurality of contiguous evaluation and selection time periods inclusive of at least one full market cycle;

defining, via the computer, the evaluation time periods and the selection time periods of the analysis period to be of equal length, co-continuous and of longer length than that of the period chosen for the calculation of periodic returns;

calculating, via the computer, and appending to the data-record, stored in the storage device, for each asset-class population member the measurements of the average and standard deviation of periodic returns, as derived from the data of periodic returns for each evaluation and selection period;

calculating, via the computer, and appending to the data-record, stored in the storage device, of each asset-class population member the measurements of population-averages for the average and standard deviation of periodic returns of the members of the asset-class for each evaluation and selection period;

calculating, via the computer, and appending to the data-record, stored in the storage device, of each asset-class population member the measurements of market and differential returns; the market return formulated as the average of average returns for the asset-class population at the point of standard deviation of periodic returns for the population member and the differential return formulated as the difference between the member's average return and the average of average returns for the asset-class population at the point of standard deviation of periodic returns for the population member, as plotted as the vertical difference between the two points on its means-variance graph, for each selection period;

calculating, via the computer, and appending to the data-record, stored in the storage device, of each asset-class population member the measurement of standard differential return for each selection period, as its normalized value when calculated relative to the distribution characteristics of its asset-class population for that selection period, as formulated as the measurement of a standard normal cumulative distribution;

plotting, via the computer, the distribution of investment performance for the asset-class population of each evaluation period within the analysis period as the measurements of the average and standard deviation of periodic investment returns for each member of that asset-class population on a mean-variance graph and retaining the record of points of that distribution using the computer;

bisecting the investment performance distribution of each evaluation period asset class populations into two halves, via the computer, by a division line formulated as a straight line of equal slope for each population as plotted on its mean-variance graph, through a point of population-average for the standard deviation of periodic returns and appending an identifier to the data-record of each evaluation period asset-class population member, via the computer, that references their inclusion into one of the bisected halves on the plotted graph;

calculating, via the computer, and appending to the data-record, stored in the storage device, for each evaluation period asset-class population member the measurement of the average of standardized differential returns for the population of each bisected-half for each selection period subsequent to and immediately following each evaluation period;

calculating, via the computer, the correlation coefficient of the average standardized differential return between each bisected-half for the plurality of evaluation periods;

determining, via the computer, and storing as a data-record in the storage device, the characteristic correlation-axis for the asset class population as the slope of the bisection through the point of population-average for the standard deviation of periodic returns for the plurality of evaluation periods that produces the lowest correlation coefficient of the average standardized differential return between each bisected half for the plurality of evaluation periods;

bisecting, via the computer, the investment performance distribution of the evaluation period asset class population into two halves by a division line formulated as a straight line of equal slope for each population as plotted on its mean-variance graph, through a point of population-average for average return and appending an identifier to the data-record of each evaluation period asset-class population member referencing their inclusion into one of the bisected halves;

calculating, via the computer, and appending to the data-record in the storage device, of each evaluation period asset-class population member the measurement of the average of standardized differential returns for the population of each bisected-half for each selection period subsequent to and immediately following each evaluation period for each evaluation period;

determining, via the computer, and storing as a data-record in the storage device the characteristic performance-axis for the asset class population as the slope of the bisection through the point of population-average for average return for the plurality of evaluation periods that produces the greatest difference of the average standardized differential return between each bisected-half for the plurality of evaluation periods;

calculating, via the computer, measurements of the average and standard deviation of periodic returns and population-averages of those average and standard deviation of periodic returns for the members of an asset class population formulated under the same criteria as the asset class populations of the analysis period and for an evaluation period of equal length and subsequent to the evaluation periods of that class for the analysis period;

plotting, via the computer, the distribution of investment performance for this asset-class population of an evaluation period subsequent to the analysis period as the measurements of the average and standard deviation of periodic investment returns for each member of that asset-class population on a mean-variance graph and retaining, via the computer, the record of points of that distribution in the storage device;

segmenting, via the computer, the performance distribution for this asset-class population of an evaluation period subsequent to the analysis period into quartiles and utilizing, as segmentation criteria, the measurements of characteristic correlation-axis and characteristic performance-axis found for the asset-class populations of the analysis period;

appending, via the computer, to the data-record in the storage device, of each member of this asset-class population of an evaluation period subsequent to the analysis period a reference identifying their inclusion into one of the quartiles on the plotted graph for that evaluation period;

calculating, via the computer, averages of the average and standard deviation of periodic returns for the populations of each quartile group of this asset-class of an evaluation period subsequent to the analysis period; and selecting, via the computer, for investment in a selection period immediately following the term of an evaluation period and occurring subsequent to the analysis period those members within the quartile group that are identified within the evaluation periods of the analysis period as generating the highest average return for the lowest standard deviation of periodic returns for the selection periods within that analysis period.

2. The method of claim 1, wherein the step of calculating the slope of a division line as plotted on a mean-variance graph is determined, via the computer, by the formula:

[slope]=[change in average return]/[change in standard deviation of return].

3. The method of claim 1, wherein the step of appending, via the computer, an identifier to the data-record in the storage device for each asset-class population member referencing their inclusion into one of the bisected halves for each evaluation period is further comprised of the step of modifying, via the computer, that identifier to include a reference as to whether the point of the average of periodic returns for the member is either greater than or less than the average of periodic returns for a point on the division line at the same level of standard deviation of periodic returns for an evaluation period.

4. The method of claim 1, wherein the step of calculating, via the computer, the points of the average of periodic returns along a division line of the plotted graph used for bisecting the asset class population into two halves is determined by the following formula:

[division-line return]=[market-return]−(([market-return]−[population average of the average of periodic returns])*constant {K}).

5. The method of claim 1, wherein the step of segmenting, via the computer, the performance distribution as plotted on a mean-variance graph for this asset-class population of an evaluation period subsequent to the analysis period into quartiles using the measurements of characteristic correlation-axis and characteristic performance-axis found for the asset-class populations of the analysis period is further comprises the step of:

determining, via the computer, the characteristic correlation-axis for an evaluation period asset class population as a division line of infinitive slope bisecting the performance distribution of the asset class population through the point of population-average for the standard deviation of periodic returns; and determining, via the computer, the characteristic performance-axis for an evaluation period asset class population as a division line of zero slope bisecting the performance distribution of the asset class population through the point of population-average for the average of periodic returns.

* * * * *